US012239858B2

(12) United States Patent
Tilk et al.

(10) Patent No.: US 12,239,858 B2
(45) Date of Patent: Mar. 4, 2025

(54) GLASS BREAKING TOOL

(71) Applicants: Gerald Joseph Tilk, Williamsburg, VA (US); Howard Garrett Beasey, Largo, FL (US)

(72) Inventors: Gerald Joseph Tilk, Williamsburg, VA (US); Howard Garrett Beasey, Largo, FL (US)

(*) Notice: Subject to any disclaimer, the term of this patent is extended or adjusted under 35 U.S.C. 154(b) by 291 days.

(21) Appl. No.: 18/092,367

(22) Filed: Jan. 2, 2023

(65) Prior Publication Data
US 2024/0216720 A1 Jul. 4, 2024

(51) Int. Cl.
A62B 3/00 (2006.01)
B60R 22/32 (2006.01)

(52) U.S. Cl.
CPC .............. *A62B 3/005* (2013.01); *B60R 22/32* (2013.01)

(58) Field of Classification Search
CPC ........... A62B 3/005; A62B 3/00; B60R 22/32; B25D 2250/271; B25D 151/02; B25D 151/04; B25F 1/006; F21V 23/0414
USPC ............................................. 7/144, 145, 158
See application file for complete search history.

(56) References Cited

U.S. PATENT DOCUMENTS

| 10,603,525 | B2* | 3/2020 | Krueger | A62B 3/005 |
| 2008/0316737 | A1* | 12/2008 | Summers | F41B 15/022 |
| | | | | 463/47.7 |
| 2012/0240417 | A1* | 9/2012 | Lee | A62B 3/00 |
| | | | | 30/366 |

* cited by examiner

*Primary Examiner* — Robert F Neibaur
(74) *Attorney, Agent, or Firm* — Bednarek Legal, PLLC

(57) ABSTRACT

A glass breaking tool that includes an impact head optimized to improve impact force and retraction of glass. The glass-breaking tools system includes an impact head, solid rubber or plastic handle or telescoping baton and adapters to connect the impact head to the baton. The impact head has glass-breaking projections aligned to accommodate a lateral swinging motion so that at least one pin will make contact with the glass even when the baton is swung laterally to the longitudinal axis of the baton. The shape and orientation of the components are designed to optimize performance.

The impact head extends along a longitudinal axis from a first axial end to a second axial end and a handle attached to the second axial end of the impact head. The impact head has a cylindrical mass section extending along the longitudinal axis, a conically tapered section that extends from a first end of the cylindrical mass section conically toward the first axial end of the impact head and a rake portion with a cylindrical periphery extending from a second end of the cylindrical mass portion that is opposite the first end of the cylindrical mass portion.

17 Claims, 21 Drawing Sheets

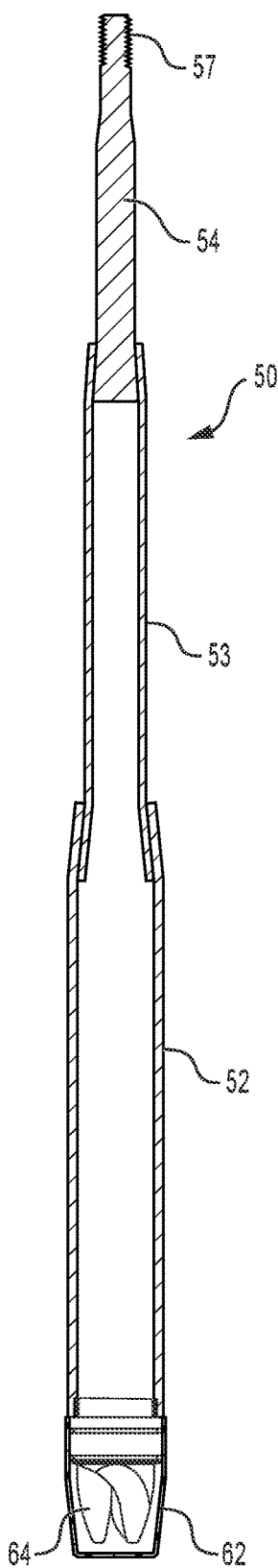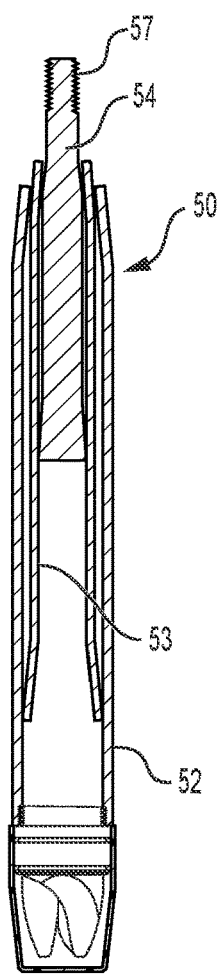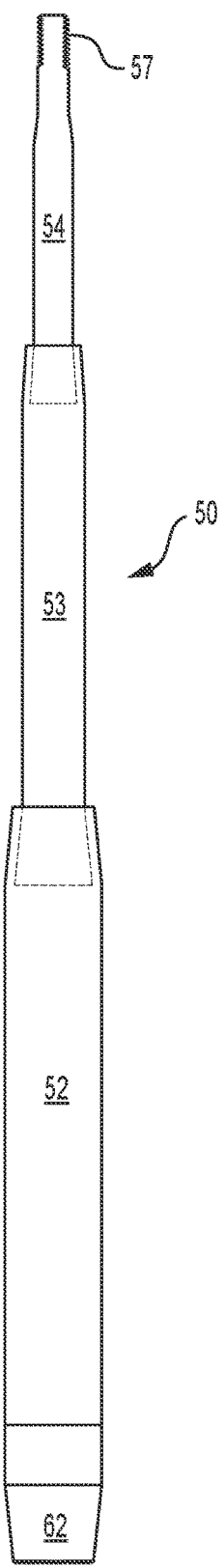
*FIG. 23*  *FIG. 24*  *FIG. 25*

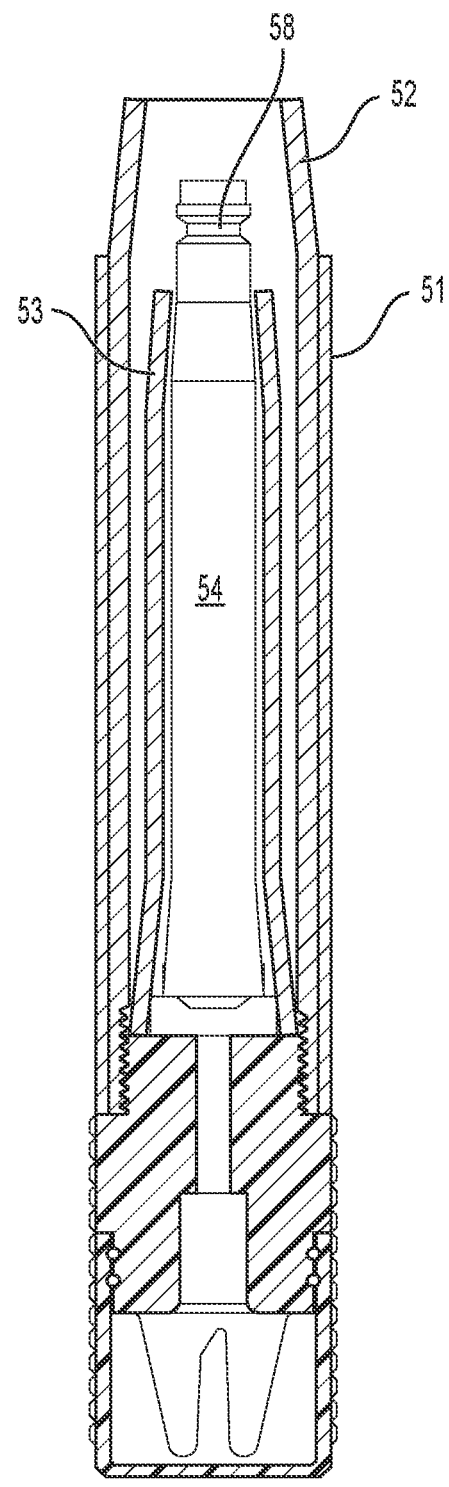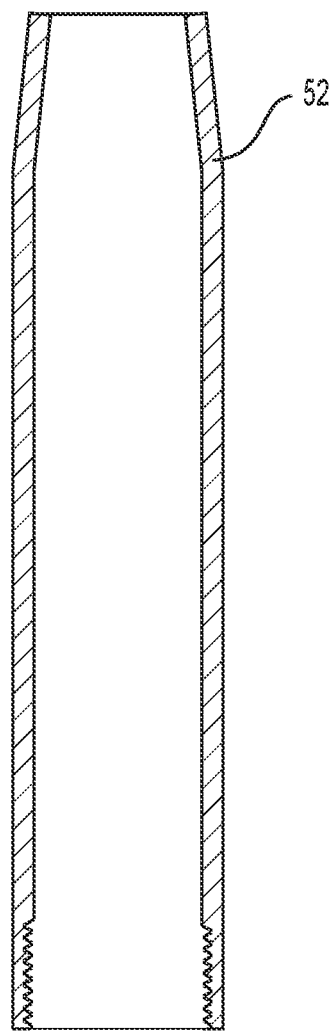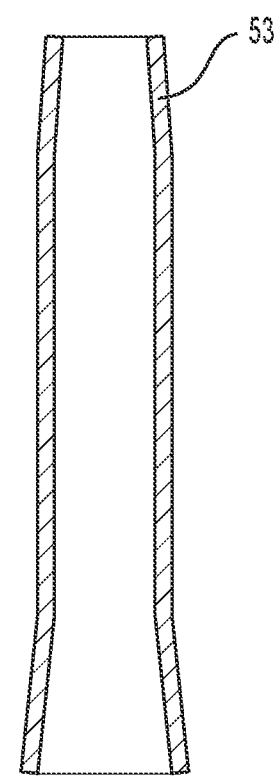
FIG. 35  FIG. 36  FIG. 37

GLASS BREAKING TOOL

FIELD OF THE INVENTION

The invention relates to a glass-breaking attachment for of the type carried by emergency response workers, law-enforcement officers, correctional staff, security guards and military personnel. Aspects of the invention are useful for consumer vehicle escape and building escape as well.

BACKGROUND

Glass-breaking devices are an essential tool for emergency responders and individuals who may need to quickly and safely break through a glass surface to access a building or vehicle, or for individuals to escape from a building or a vehicle in an emergency situation. Safety glass, in particular, is a type of glass that is designed to shatter into small, harmless pieces when it is broken, as opposed to shattering into large, sharp shards. This is an important safety feature in many buildings and vehicles, as it helps to prevent injury from flying glass in the event of an accident or emergency. Glass-breaking devices can be used by first responders, such as firefighters and paramedics, to quickly and safely break through a glass surface in order to access people or objects inside, or can be used by individuals to safely break through a glass surface to escape from a dangerous situation inside a building or vehicle.

One of the main reasons for the need for glass-breaking devices is the fact that glass can be a very difficult material to break through. It is strong, durable, and can be difficult to shatter even with a significant amount of force. This can make it difficult for first responders to gain access to a building or vehicle in an emergency situation, which can delay the provision of necessary medical care or other assistance.

Laminated glass and safety glass are two types of glass that are designed to provide enhanced strength and safety in different ways.

Laminated glass is a type of glass that is made by sandwiching a layer of plastic between two layers of glass. When laminated glass is struck with a force, the plastic layer helps to absorb the energy of the impact and prevent the glass from breaking. As a result, laminated glass is less likely to shatter and can provide better protection against impacts and intrusions.

Safety glass, on the other hand, is a type of glass that is designed to shatter into small, relatively harmless pieces when it is broken. This can help to reduce the risk of injury from broken glass and make the glass safer to use in certain applications. There are several types of safety glass, including tempered glass, which is heat-treated to increase its strength and shatter resistance, and wired glass, which is made by embedding a wire mesh in the glass to hold the pieces in place if it breaks.

In general, laminated glass is more resistant to breaking than safety glass, but safety glass is designed to shatter more safely if it does break. Both types of glass can be used in various applications, depending on the specific needs and requirements of the situation.

Known glass-breaking devices focus on providing a solution to the problem for breaking glass to allow first responders to gain entry quickly and easily by breaking through a glass surface without having to rely on brute force. These devices are designed to focus the force of the impact on a small area, making it easier to shatter the glass and gain access to the interior of a building or vehicle, or to access the exterior of a building or vehicle by escaping from inside. This can save valuable time in an emergency situation and ensure that first responders are able to provide the necessary assistance as quickly as possible, or allow individuals the chance to escape quickly from buildings or vehicles if traditional exits are blocked.

In addition to their use in emergency situations, glass-breaking devices can also be useful in other settings. For example, they can be used by law enforcement officers to gain access to a locked vehicle or building in order to apprehend a suspect or rescue a person in danger. They can also be used by civilians in the event of a car accident or other emergency to quickly and safely escape from a vehicle or building.

Overall, the need for glass-breaking devices is clear. They provide a valuable tool for first responders and others in emergency situations, allowing them to quickly and easily gain access to a building or vehicle in order to provide the necessary assistance. They are a critical part of any emergency response kit, and can help to save lives in a variety of situations.

There are a variety of glass-breaking devices on the market, each designed for a specific purpose and type of glass. Some of the most common types of glass-breaking devices include the following:

Spring-loaded center punches: These devices use a spring-loaded mechanism to deliver a sharp, focused strike to the center of a window, breaking the glass on impact.

Rescuers: Rescuers are handheld tools that consist of a flat, serrated edge on one end and a pointed tip on the other. To use a rescuer, the pointed tip is placed against the window and the serrated edge is used to strike the glass, creating a crack that can be followed by the rescuer's pointed tip to break the glass.

Glass break hammers: These devices are similar to rescuers, but are designed for use with a hammer. The glass break hammer has a pointed tip on one end and a flat, serrated edge on the other. To use a glass break hammer, the pointed tip is placed against the window and the hammer is used to strike the flat, serrated edge, breaking the glass.

In addition to these manual glass-breaking devices, there are also power tools that can be used to break glass. These include electric rotary hammers, which use a high-speed rotating drill bit to quickly and efficiently break through windows, and hydraulic spreaders, which use powerful hydraulic pressure to separate the glass from its frame and break it.

Known glass-breaking tools also include impact tools of the type described in U.S. Pat. No. 10,603,525 to Krueger, et. al. Krueger teaches that handheld devices (such as a baton) that are utilized to break glass and provide access to an environment require the individual utilizing the device to break the glass while standing adjacent to the glass and holding the device. According to Krueger, this can result in injury to the individual by broken glass becoming embedded in the individual's body or as a result of the manual force required to advance the handheld device through the glass. To allow an individual to break glass while positioned at a safe distance away from the glass or a distance from the glass in instances in which a fire or other hazardous situation exists in the environment within which the individual is attempting to gain access, Krueger discloses various impact tools that can be thrown at a material intended to be damaged. The impact tools described by Krueger are designed such that at least two projections of a plurality of projections contact a surface that the impact tool is thrown at such that the material forming the surface can be damaged by the impact tool. The position of the projections is an important aspect of impact tools described by Krueger, which teaches that it is advantageous that at least two projections intersecting the first hypothetical plane comprise a first projection and a second projection, the first projection and the second projection positioned such that the first projection is disposed on a cross-section taken along the central lengthwise axis of the core and the second projection is not disposed on the cross-section taken along the central lengthwise axis of the core.

Similar impact tools include the "X-Ball"-a one-pound ball with a geometric design of 12 facets. Each facet on the metal ball is rubber covered and sports a screw-in metal cleat with a carbide steel tip. The projections are arranged such that when the ball is thrown, it always hits on the carbide steel tips and that makes the glass shatter. An attachment for the X-Ball known as X-Pole is a static steel pole that is 32 inches long and allows officers to break and rake glass. It can be used on vehicles and on building windows. Both the X-Ball and the X-Pole allow users to break glass from a distance. Another "X" product is the X-Baton. The X-Baton is an expandable baton that, instead of a blunt "button" on the end of the baton, features half of an X-Ball. The X-Ball has a total of six cleats for breaking the glass and a rake for removing the shards.

Published application US20210101030A1 to Michael Schnell discloses another form of impact tool. The impact tool described by Schnell includes a first elongate member and an impact member. The first elongate member has a first elongate member first end and a first elongate member second end. The impact member is attached to the first elongate member. The impact member has an impact member first end, an impact member second end, an impact member length that extends from the impact member first end to the impact member second end, an impact member first side, an impact member second side, and a plurality of projections disposed on the impact member second side and along the impact member length. Each projection of the plurality of projections has a first end attached to the impact member and a second end. The plurality of projections is configured on the impact member such that at least two projections of the plurality of projections intersect a first hypothetical plane that is disposed between the impact member second side and the second end of each projection of the plurality of projections.

Regardless of the type of glass-breaking device used, it is important for first responders to be trained in their proper use and to follow safety guidelines when using these tools. This can help to prevent injuries to first responders and others in the area, and can ensure that the glass-breaking device is used effectively in emergency situations.

Police batons are long, retractable sticks that are used by law enforcement officers as a non-lethal method of control. They are designed to be a less lethal alternative to firearms, and they can be used to strike, jab, or block blows in order to subdue a suspect or to defend oneself.

There are several different types of police batons, each of which has its own unique features and characteristics. Some of the most common types of police batons include:

Expandable batons: These batons are made of telescoping sections that can be quickly extended to their full length with a flick of the wrist. They are typically made of strong and durable materials, such as steel or aluminum, and they can be used to deliver powerful blows.

Fixed batons: These batons are solid and do not have any telescoping sections. They are typically shorter and more compact than expandable batons, making them easier to carry and conceal. They are also typically made of strong and durable materials, such as wood or metal, and they can be used to deliver powerful blows.

Shock batons: These batons are equipped with an electrical current that can be used to shock and incapacitate a suspect. They are typically used in situations where a suspect is resisting arrest or posing a threat, and they can be an effective way to quickly subdue the suspect.

An expandable baton is typically composed of a cylindrical outer shaft containing telescoping inner shafts that lock into each other when expanded. The shafts are usually made of steel, but lightweight baton models may have their shafts made from other materials such as aluminum alloy.

Expandable batons may have a solid tip at the outer end of the innermost shaft; the purpose of the solid tip is to maximize the power of a strike when the baton is used as an impact weapon. The solid tip may be threaded into the end of the innermost shaft or formed integrally therewith.

An expandable baton is opened by being swung in a forceful manner while collapsed, using inertia to extend and lock the segments by friction. Some mechanical-lock versions can also be opened by simply pulling the segments apart. Depending on the design, expandable batons may be collapsed either by being brought down (inverted) on a hard surface, or by depressing a button lock and manually collapsing the shafts. The expandable baton can be used as a glass-breaking device to gaining entry quickly to a vehicle or building. In such a situation the baton is deployed and, due to the solid end of the device, is used to strike windows to either gain entry.

An ASP (Armament Systems and Procedures) police baton is a type of collapsible baton that is often used by law enforcement officers for self-defense and crowd control. These batons are typically made of metal, such as aluminum or steel, and are designed to be lightweight and easy to carry. They are also often equipped with a rubber or foam grip for improved handling.

ASP batons are typically telescopic—they can be extended or collapsed to adjust the overall length. The size of an ASP baton can vary depending on the specific model, but they are generally between 10 and 36 inches long when fully extended. The collapsed length of an ASP baton is usually shorter, typically between 6 and 12 inches, depending on the model. The length of an ASP baton is often chosen based on the intended use and the preferences of the user. For example, a shorter ASP baton may be more convenient to carry and easier to use in close quarters, while a longer ASP baton may provide more reach and leverage. To use the baton, an officer simply has to grasp the handle and flick their wrist to extend the baton to its full length. The baton can then be used for striking or as a blocking tool.

Breakaway tips are available to turn a baton into a glass-breaking tool that has one or more spikes thereon. Known glass-breaking tips are designed to be interposed between the cap and handle of an expandable baton. Removing the tip cover exposes a ground ceramic pin that can break a side window or punch an entry circle in a windshield. A machined aluminum geodome ensures at least one pin will make contact with the tempered glass of a car window whatever the angle of application. Even with known glass-breaking tips, known batons require application of a punching or stabbing force that may not be sufficient to break some glass.

Overall, police batons are an important tool for law enforcement officers, providing them with a non-lethal means of control in potentially dangerous situations. These batons are designed to be effective and versatile, and they can be used in a variety of ways to protect officers and civilians alike. However, known glass-breaking devices are optimized for entry into a glass enclosed area and may be suboptimal for escape from a glass enclosed area. therewith.

SUMMARY

The present invention provides improvements in glass breaching and breaking tools including an impact head attachment that transforms a baton into a swingable glass-breaking tool that allows application of much greater impact energy than known designs. Embodiments of the invention collectively provide a system of glass-breaking impact tools that includes glass-breaking impact heads, adaptive attachment connectors and various adjustable length batons. As a system, the various embodiments allow a wide variety of configurations to suit specific applications including police rescue operations, consumer vehicle escape applications and building escape applications. Embodiments are optimized for escape from glass enclosed areas as opposed to entry into glass enclosed areas. In particular, the devices include the option of a short non-telescoping rubber or plastic handle that allows the device to be swung in a confined space. The handle may optionally include telescoping sections to allow adjustment of length from a handle to a full-length baton or intermediate lengths. The impact heads include a cylindrical mass section to optimize the center of gravity of the impact head and increase force at close distances.

Other embodiments include use of an impact head as described herein as an attachment for transforming an ordinary baton into a swingable glass-breaking tool that allows application of much greater impact energy than known designs. The impact head includes an impact section that is at least partially conical, a plurality of threaded openings on a plurality of planar projection support surfaces, a cylindrical mass section, a glass rake portion that includes a rake extensions and rake scallops and structure to attach to an ordinary baton. One embodiment includes a threaded adapter opening having an axis that is colinear with the longitudinal axis of the impact head.

Embodiments of the invention include various forms of glass-breaking impact head. An embodiment of glass-breaking head includes three sections: a projection support section for supporting conical projections with carbide tips, a force enhancing cylindrical mass section and a symmetrical glass extraction section.

The central mass in the force enhancing smooth cylindrical mass section increases the force applied at the carbide tips, minimizes resistance moving through the air and also enhances the ability of the tool to move past the broken glass easily so that the extraction tool can be used. It is advantageous if the axial dimension of the cylindrical mass section is about the same or greater than that of the conical section to ensure that sufficient mass is provided.

The scalloped glass extraction portion should not have radial dimension that exceeds the dimension of the cylindrical mass section to avoid interference with the head passing through the glass. The exterior of the extraction portion is smooth and cylindrical to minimize resistance moving through the air and past the glass. Scalloped portions of the peripheral glass rake sections grab glass for extraction.

The conical or partially conical (truncated) core section provides a base and support for an array of glass-breaking peripheral projections positioned such that the projections are disposed on a common cross-section plane taken along the central lengthwise axis of the core. In other words, the peripheral projections are arranged such that all of the peripheral projections are disposed on a cross-section taken along the longitudinal axis of the impact head. A carbide tip is provided on each projection. Collectively the carbide tips lie along a circle circumscribed on a common plane and are equally spaced in a circular layout with each tip angled.

If the core section is truncated to form a frustum shape, an additional projection is provided at or near the apex of the cone and a carbide tip is provides on the projection. Alternatively, the conical section may have a carbide tip located directly at the tip. This axial carbide tip extends colinearly with the axis of the core section. This axial carbide tip together with any two peripheral tips form a triangle. When impacting glass, once two of the three tips in a triangle contact the glass surface, the device will have a natural pivot or snap movement toward a third tip increasing head speed of the third tip so the force applied by the third tip is enhanced.

The projection support portion includes an array of planar projection supports arranged, preferably evenly spaced, around the conical portion so as to provide a planar support for the projections. A threaded opening is provided on each planar support surface to receive a threaded projection. The threaded opening is perpendicular to and extends into the planar support. The projections have a flat base that conforms to the planar support. A washer may be provided to ensure a secure fit.

Embodiments of the glass-breaking devices described herein are optimized for use by those trying to escape from as opposed to entering a glass-enclosed area. Conventional glass-breaking devices are mainly used to gain entry through a glass window into a building or vehicle. There are several challenges that can make it difficult to use conventional glass-breaking tools to escape from inside a car or building. The glass-breaking devices must be readily accessible in an emergency. Tools that are too large to be stored in a glove compartment or center console of a vehicle may not be available when and where needed. Also, conventional glass-breaking tools, such as spring-loaded center punches or hammer-style tools, may not be strong enough to break the thick, laminated safety glass used in many modern car windows.

Ease of use in a confined space is another challenge to using conventional glass-breaking tools effectively, especially under stress or in a hurry in the confined environment of a vehicle interior. Baton-type expandable devices might be too long to swing effectively. Safety is another challenge: Using a glass-breaking tool can also pose a risk of injury to the user, as the tool itself or the broken glass can cause cuts or other injuries. Overall, using conventional glass-breaking tools to escape from inside a car can be challenging and there is a need for a better solution.

Embodiments of the invention optimized for escape, as opposed to entry, through glass include a long baton for building escape and a single non-expandable rubber/plastic handle version for vehicle escapes. While embodiments in which the impact head 10, 110 is used on an ordinary police baton or a telescoping baton are shown and described herein, the impact heads 10, 110 described herein are suitable for attachment to any handle. One such embodiment provides a short tool (less than 10 inches) with a lightweight rubber or plastic handle that is attached to an impact head. The non-expandable single rubber or plastic handle device is useful for the civilian general public as both a vehicle and building escape device. Also, the single-handle device can be used by Emergency Services personnel who may not need an expandable baton if a suitable rubber or plastic handle device exists.

Rubber and certain plastics are materials that absorb and dissipate impact forces more effectively than metal. This is because rubber is a viscoelastic material, which means that it exhibits both viscous and elastic behavior when subjected to a load. When force is transmitted through a rubber or plastic tool handle, the rubber or plastic material will deform and stretch, absorbing and dissipating the energy of the impact. This can help to reduce the transmission of the impact force through the handle to the user's hand, making the tool more comfortable and safer to use.

In contrast, a metal tool handle will transmit the impact force more directly to the user's hand, potentially causing discomfort or injury. Metal is a much stiffer and less forgiving material, so it is not as effective at absorbing and dissipating impact forces. Overall, a rubber or plastic tool handle can provide better impact resistance and shock absorption than a metal handle, making it a more comfortable and safer choice for many applications.

It can be difficult to swing a baton in the interior of a vehicle because of the limited space and the presence of various objects that can obstruct the swing or cause the baton to strike unintended surfaces or objects. In a vehicle, there are often many tight, confined spaces and objects such as seats, steering wheels, and dashboard components that can get in the way of a full swing. This can make it difficult to generate sufficient force or momentum to break glass effectively. Additionally, the close proximity of the baton to the user's body and the risk of the baton striking unintended surfaces or objects can make it difficult to control the baton and increase the risk of injury to the user or others in the vehicle.

For these reasons, it is often better to use a short-handled tool, such as a rubber or plastic handle and an impact head. Overall, a rubber or plastic tool handle can provide better impact resistance and shock absorption than a metal handle, making it a more comfortable and safer choice for many applications. A tool specifically designed for use in confined spaces with a shorter handle that allows for more precise control and reduces the risk of accidentally striking unintended surfaces or objects.

A glass-breaking tool for escaping from the interior of a vehicle should be small enough to fit into the glove compartment or center console because these are typically the most accessible and convenient places to store the tool in a vehicle. In the event of an emergency, such as a collision or fire, it is important to be able to quickly and easily access the glass-breaking tool in order to escape from the vehicle. If the tool is too large or bulky, it may be difficult to find or retrieve in a hurry, potentially delaying the escape process and increasing the risk of injury. By keeping the tool small enough to fit into the glove compartment or center console, it can be easily located and retrieved in an emergency situation, allowing for a quicker and safer escape from the vehicle.

The maximum length of a tool to ensure that it will fit in the glove compartment or center console of most vehicles will depend on the size and layout of the specific vehicle. However, as a general rule, a tool should be no longer than approximately 10 inches in length (inclusive of the impact head) in order to fit comfortably in the glove compartment or center console of most vehicles. While the size and layout of the glove compartment and center console can vary significantly from one vehicle to another, it has been found a tool that is no longer than approximately 10 inches in length will fit comfortably in the glove compartment or center console of most vehicles.

In an emergency situation, a glass-breaking tool can be helpful in helping children escape from a classroom by providing a quick and effective way to break through a window or other type of glass to evacuate the building. If a fire or other emergency occurs and the children need to evacuate the classroom, they may be unable to use the door to exit due to the presence of smoke or other hazards. In this case, breaking a window may be the safest and quickest way to escape.

A glass-breaking tool can be used to quickly and easily shatter the window, creating an opening for the children to crawl through and escape. The tool can include a rake portion to be used to remove any remaining shards of glass from the window frame to prevent injury as the children exit through the opening.

An embodiment of glass-breaking tool optimized to help children escape from a classroom includes a telescoping baton with a carbide-tipped spiked projections. This type of tool is extendible, meaning that it can be extended to different lengths to reach different heights or distances. The telescoping baton would be long enough to reach the glass from a safe distance, so that the glass does not break on the user. The impact head end of the baton can be used to strike the glass and shatter it, creating an opening for the children to crawl through and escape.

The telescoping feature of the baton allows it to be easily adjusted to the appropriate length for the specific situation, making it a versatile and effective tool for breaking glass in a classroom or other confined space from a safe distance.

As noted, impact tools use kinetic energy to break glass. Translational kinetic energy of a body is equal to one-half the product of its mass, m, and the square of its velocity, v, or $\frac{1}{2}mv^2$. As such, it is advantageous to optimize mass and velocity to achieve the greatest kinetic energy.

Optimizing the head speed and swing weight in a glass-breaking device is important for ensuring that the device is able to effectively break through glass. The head speed refers to the speed at which the device strikes the glass, while the swing weight refers to the mass of the device as it swings towards the glass.

To optimize the head speed, it is important to strike a balance between having enough speed to effectively break through the glass, while not being so fast that the device becomes difficult to control. One way to achieve this balance is to use materials with a high tensile strength in the construction of the device to reduce the amount of energy that is lost during the impact, allowing for a faster head speed.

In terms of optimizing the swing weight, the goal is to find a weight that is heavy enough to effectively break through the glass, but not so heavy that the device is difficult to swing. One way to achieve this is to use materials that are dense and have a high mass, such as metals, in the construction of the device. This can provide the necessary weight without adding too much bulk. Additionally, using a well-balanced design can help to distribute the weight evenly, making it easier to swing the device and improve its effectiveness. While known batons are typically made of strong and durable metal materials, such as steel or aluminum, the impact heads described herein can also be attached to lighter weight less costly rubber or plastic handles so that overall tool mass is distributed toward the impact head. In addition, a non-metallic material such as rubber has elasticity so that a handle constructed of an elastic material such as rubber may absorb impact force.

Rubber is a material that is able to absorb and dissipate impact forces more effectively than metal. This is because rubber is a viscoelastic material, which means that it exhibits both viscous and elastic behavior when subjected to a load. When a rubber tool handle is struck with an impact force, the rubber material will deform and stretch, absorbing and dissipating the energy of the impact. This can help to reduce the transmission of the impact force through the handle to the user's hand, making the tool more comfortable and safer to use.

In contrast, a metal tool handle will transmit the impact force more directly to the user's hand, potentially causing discomfort or injury. Metal is a much stiffer and less forgiving material, so it is not as effective at absorbing and dissipating impact forces. Overall, a rubber tool handle can provide better impact resistance and shock absorption than a metal handle, making it a more comfortable and safer choice for many applications.

Overall, optimizing the head speed and swing weight in a glass-breaking device requires finding a balance between these factors using dense materials in the construction of the device, and employing a well-balanced design, it is possible to create a glass-breaking device that is both effective and easy to control.

The impact of a carbide protection tip imparts kinetic energy from the tool to the glass. So, all else being equal, a heavier head would have more kinetic energy and the impact would transfer more of that energy to the glass. However, kinetic energy is mass multiplied with velocity squared. So, any increase in mass only helps so much, while any increase in head speed helps so much squared. Since impact tools are designed for use by a range of human beings and driven by body action, the kinetic energy in the tool club needs to be produced by the human swinging it. If you want a human to swing a heavier tool, there is a point of diminishing returns where the user will probably not be able to swing it as quickly. In addition, the heavier head of the tool on the far end of a shaft that acts as a lever, so a heavier head can feel heavier still, when held parallel to the ground (swing weight). Thus, it is important to optimize head speed, instead of weight. Mass and distance are factors that influence the ability to generate head speed, but aerodynamic drag on the tool head is another factor to be considered. A smooth cylindrical surface of the extraction tool reduces aerodynamic drag.

Another factor to consider is the direction of the reaction force applied tool on impact. It is advantageous to apply the force at an angle of about 45 degrees to the axis of the tool to reduce the shearing force on the tool. However, by aligning the projections at an angle greater than 45 degrees, but less than 90 degrees, the impact plane defined by two adjacent peripheral carbide tips and the axial carbide tip is broadened and moved toward the direction of impact to improve performance. This arrangement of the projections ensures that at least on carbide tip will make contact with the glass even when the baton is swung laterally to the longitudinal axis of the baton. This is in contrast to known designs, which require a punching or stabbing motion that is generally in the longitudinal direction.

All things being equal, a tool's swing weight will increase as the tool's weight is shifted toward the head of the tool. If the weight shifts toward the handle, the swing weight will decrease.

Embodiments of glass-breaking impact heads described herein are the result of optimization of these factors.

The arrangement of all the peripheral carbide-tipped projections on a common plane that is axially spaced from the carbide tip at the apex of the conical portion of the impact head optimizes impact force.

The smooth cylindrical periphery of the central mass and glass extraction portions of the impact head optimizes "head speed" and passage through glass, especially safety glass.

The shape of the glass extraction portion ensures engagement with glass independent of the orientation of the tool.

Batons with up to five telescoping sections that can be independently friction locked to allow adjustment to accommodate different users. Alternatively, the impact head can be attached to a single-piece handle device. A non-expandable single rubber, plastic or metal handle device is useful for the civilian general public as both a vehicle and building escape device. Also, the single-handle device can be used by Emergency Services personnel who may not need an expandable baton if a suitable rubber handle device exists.

Additional advantageous features include a dual threaded adapter system that allows attachment of the impact head to various batons, a button quick connect adapter collar that allows the impact head to be attached to a baton with a button tip, projections with a hex shaped peripheral surfaces to allow a wrench to tighten or loosen the projection for servicing. The batons also preferably a seatbelt cutter at the bottom end, preferably covered by a cap.

Embodiments of the glass breaking tool include an impact head that extends along a longitudinal axis from a first axial end to a second axial end and a handle attached to the second axial end of the impact head. The impact head has a cylindrical mass section extending along the longitudinal axis, a conically tapered section that extends from a first end of the cylindrical mass section conically toward the first axial end of the impact head and a rake portion with a cylindrical periphery extending from a second end of the cylindrical mass portion that is opposite the first end of the cylindrical mass portion. A plurality of planar projection support surfaces are provided on the conically tapered section of the impact head. The planar support surfaces are spaced around the periphery of the conically tapered section. A threaded opening is provided on each of the plurality of planar projection support surfaces. The threaded opening has a thread axis that extends perpendicular to the planar support surface, the threaded openings of all of planar support surfaces lie on a common plane perpendicular to the longitudinal axis of the impact head and the thread axes of the plurality of the threaded openings intersect the longitudinal axis of the impact head at a single point where the included angle at the point of intersection being greater than 45° degrees and less than 90°. A plurality of peripheral projections are provided with each projection including a conical spike portion at one longitudinal end and a threaded portion at the other longitudinal end. The conical spike portion supports a carbide tip and the threaded portion is threaded into a threaded opening. The plurality of projections are spaced around the periphery of the impact head such that projections are coplanar and the carbide tips of the spaced peripheral projections are located on a common plane that is perpendicular to the longitudinal axis of the impact head. The impact head includes handle attachment structure such as threaded part or a quick release to attach the handle to the second axial end of the impact head.

The peripheral projections may each include a nut section between the conical spike portion and the threaded portion.

The nut section includes planar hex surfaces to facilitate threading the threaded portion into and out of a threaded opening.

DESCRIPTION OF DRAWINGS

FIG. 23 shows a sectional side view of a baton in the extended position;

FIG. 24 shows a sectional side view of the baton in the collapsed position;

FIG. 25 shows a side view of a baton in the extended position;

FIG. 35 is a partial sectional side view of a baton in the retracted position;

FIG. 36 is a sectional view of a section of the baton;

FIG. 37 is a sectional view of a section of another the baton.

DETAILED DESCRIPTION

Figure 2:
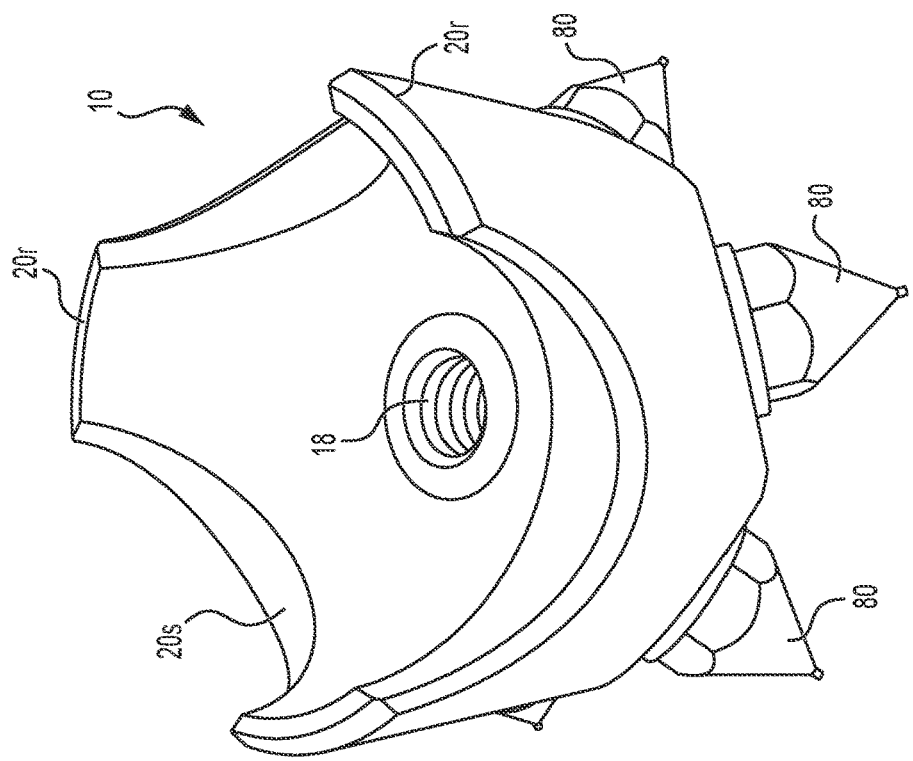
FIG. 2 shows a bottom perspective view of an impact head with projections.

FIGS. 1-37 depict embodiments of glass-breaking devices and components thereof. As shown, the glass-breaking device includes an impact head 10 and a baton 50.

The Impact Head 10 includes a conical or partially conical section 12, a threaded opening 14, a plurality of planar projection support surfaces 15, a cylindrical mass section 16, a threaded adapter opening 18 having an axis that is colinear with the longitudinal axis of the impact head 10, and a glass rake portion 20 that includes a rake extension 20r and a rake scallop 20s. When safety glass breaks, it is held together by a thin film of plastic or resin that helps to keep the pieces in place. This means that in order to escape through a broken window, it may be necessary to push the pieces of glass away rather than simply breaking through them. The peripheral rake portion 20r of the impact heads 10, 110 can be used to push and rake away broken auto glass. Because the tool is symmetrical, it is optimized to help safely remove the broken glass and create an opening free of shards of glass and large enough for a person to escape through.

A plurality of projections 80 are provided on the impact head 10. The projections preferably each include a carbide tip 82, planar hex surfaces 84 and a threaded extension 88 for attachment to the impact head. As detailed in the drawings, projections are arranged around the periphery of the impact head to optimize glass-breaking performance. A carbide tip 82 is provided at the apex of of the conical shape of the impact head 80 either directly or by providing another projection 80 at the tip of the impact head 80. In either instance, the carbide tip extends along the longitudinal axis of the impact head 10.

Carbide is a very hard and durable material that can withstand high levels of wear and tear. This makes it a good choice for the tip of a glass-breaking device, as it will be able to withstand the impact and pressure of breaking through a glass surface without dulling or breaking. Additionally, carbide is also resistant to corrosion, so it will not rust or deteriorate over time. This makes it a long-lasting and reliable option for use in a glass-breaking device.

An adapter 30 allows for attachment of the impact head 10 to various standard batons 50 with different thread sizes. The adapter 30 includes a central nut portion 32, a first threaded portion 34 have a first thread size for attachment to the impact head 10. The adapter 30 includes another threaded portion for attachment to the baton 50 and that other portion may be a threaded portion having a second thread size 36 or a threaded portion having a third thread size 37.

The baton 50 may be a solid stick of rubber or other viscoelastic material or, alternatively, may include a plurality of telescoping sections. Embodiments are shown a first telescoping section 52, a second telescoping section 53, a third telescoping section 54, a fourth telescoping section 55 and a fifth telescoping section 55. The smallest of the telescoping sections includes structure to attach an impact head 10. The structure may be in the form of a threaded opening 60 for receiving the adapter 30, a thread 57 or a quick connect fitting/button 58, The bottom of the baton includes a seat belt cutter 64 and a cap 62 covering the seat belt cutter.

Figure 32:
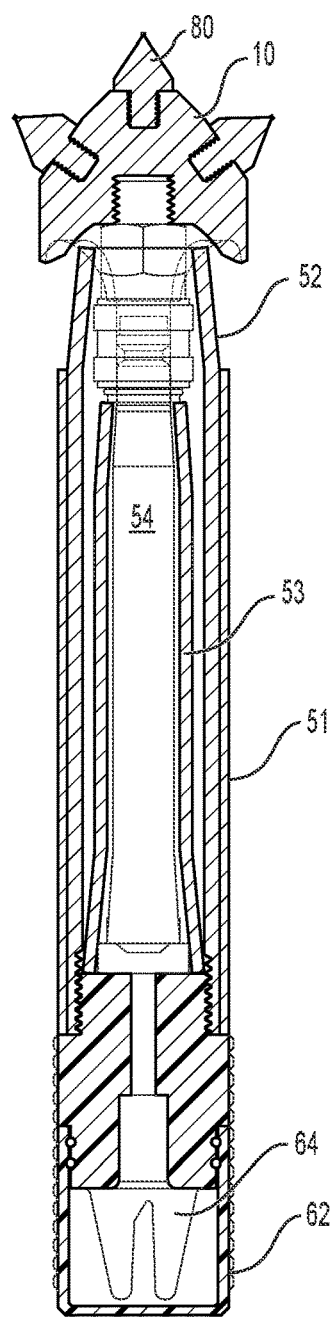
FIG. 32 is a partial sectional side view of a glass-breaking device in the retracted position.
Figure 33:
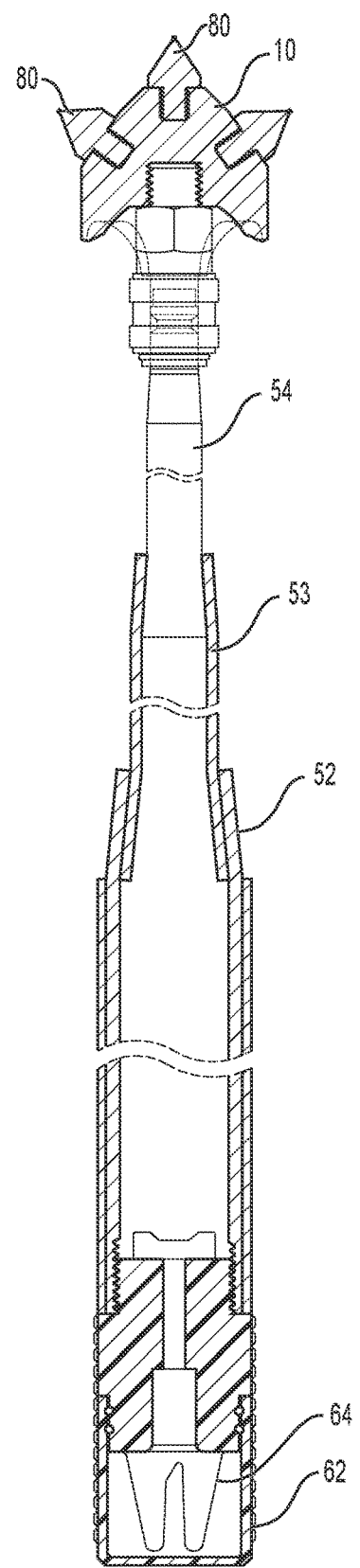
FIG. 33 is a partial sectional side view of a glass-breaking device in the expanded position.

The baton 50 may include a quick connect fitting 58 that snaps into a complementary fitting in a threaded adapter as shown in FIGS. 32 and 33 or directly into an impact head. Quick connection fittings allow for the rapid and secure connection and disconnection of an impact head, rubber ball or other implements to the baton 50. The quick connect fitting includes a male and female component, each with a circular fitting that can be locked together by spring detents. The male fitting has a protruding stem that fits into the female fitting, and the detents holds the two fittings in place by compressing the stem. To release the connection, the latch can be easily opened by mechanical action to allow the detents to retract, allowing the two fittings to be separated quickly and easily. Quick connection fittings are particularly useful in situations where various implements need to be connected and disconnected frequently.

The seat belt cutter 64 is a small tool that is designed to quickly and easily cut through a seat belt in the event of an emergency. It comprises a sharp blade or set of blades mounted on the end of the baton 50, allowing a person to grip the tool and use it to cut through the seat belt. Seat belt cutters are often carried by emergency responders, such as firefighters and paramedics, as well as by motorists in case of an accident.

The drawings depict specific design features that optimize performance of the glass-breaking device as described hereinafter.

Figure 33A:
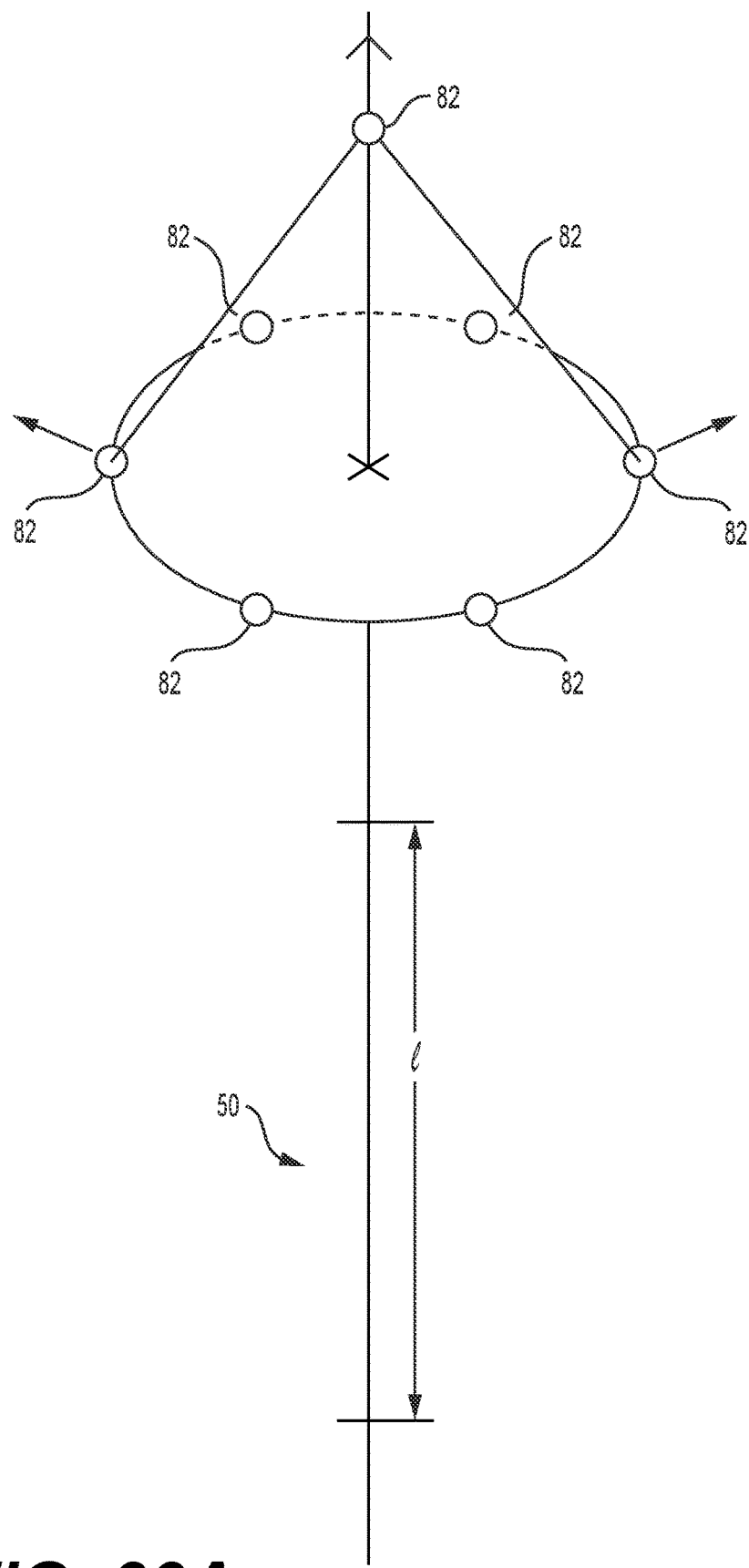
FIG. 33A is a schematic representation showing the spatial relationship of the glass-breaking carbide tips and adjustable baton.

To begin with, the peripheral projections 80 are preferably aligned on a common plane and equally spaced around the axis 3 so they are evenly distributed on either side of the axis 3 such that a circle circumscribed to include the tips as six equally spaced points around the axis. Thus, the peripheral projections are arranged such that all of the peripheral projections 80 are disposed on a cross-section taken along the longitudinal axis 3 of the impact head. The tips 82 are evenly distributed at regular intervals around the circle. In combination with the carbide tip 82 at the conical tip of the impact head 10, this arrangement optimizes breaking force on contact by either apply a broad simultaneous force (three tips) or creating snap action (two tips) that enhances impact force. FIG. 33A provides a schematic representation showing the spatial relationship of the glass-breaking carbide tips 82 and adjustable baton 50.

Important aspects of the embodiments disclosed herein include the novel rake construction, the carbide-tipped projections (spikes) arrangement on a single plane perpendicular to the longitudinal axis of the impact head and the smooth cylindrical periphery of the impact head.

Variations of the glass-breaking head are depicted, but each embodiment of glass-breaking impact head 10 includes three sections: a truncated conical (frustum) projection support section 12 that tapers toward a conical apex coincident with the longitudinal axis 3, a force enhancing cylindrical mass section 16 and a symmetrical glass extraction section 20.

The central mass in the force enhancing cylindrical mass section 16 increases the force applied at the carbide tips 82 and also enhances the ability of the tool to move past the broken glass easily so that the extraction rake 20*r* can be used. It is advantageous if the axial dimension of the cylindrical mass section 16 (FIG. 9) is about the same or greater than that of the conical section 12 to ensure that sufficient mass is provided. Importantly, the cylindrical mass section 16 also provides a broad face for secondary impact to enhance glass breakage. As noted, the carbide-tipped projections will contact the glass first, but the cylindrical mass section 16 will make a secondary impact along a broad face to apply additional glass-breaking force.

The scalloped glass extraction portion 20 should not have radial dimension that exceeds the dimension of the cylindrical mass section to avoid interference with the head passing through the glass.

The novel rake construction combines a smooth cylindrical peripheral surface 16 of the impact head allows the head 10, 110 to easily pass through broken safety glass without snagging on glass and the evenly spaced rake portions 20*r*, 120*r* defined by the scalloped sections 20*s*, 120*s* and provide a balanced grip to pull glass away evenly. The weighted impact head with rake extensions 20*r* can be dragged along broken glass to rake shards away from an opening.

The peripheral rake portion 20*r* of the impact heads 10, 110 can be used to push, pull and scrape or rake away broken glass, whether laminated or tempered glass. Because the tool is symmetrical, it is optimized to help remove the broken glass safely and create an opening large enough for a person to escape through. Thus, the rake 20*r* is useful for clearing both types of laminated and safety glass after breaking.

The conical or partially conical (truncated) core section 12 that provides a base and support for an array of glass-breaking peripheral projections 80 positioned such that the projections are disposed on a common cross-section taken along the central lengthwise axis of the core. A carbide tip is provided on each projection. Collectively the carbide tips lie on a common plane and are equally spaced in a circular layout with each tip angled at an acute angle from the axis 3. The spatial arrangement of the peripheral carbide tips 82 and axial carbide tip is illustrated in FIB. 33A. As illustrated in FIG. 33A, the baton 50 also has a length 1 that may be adjusted with optional telescoping sections as described herein.

Figure 1:
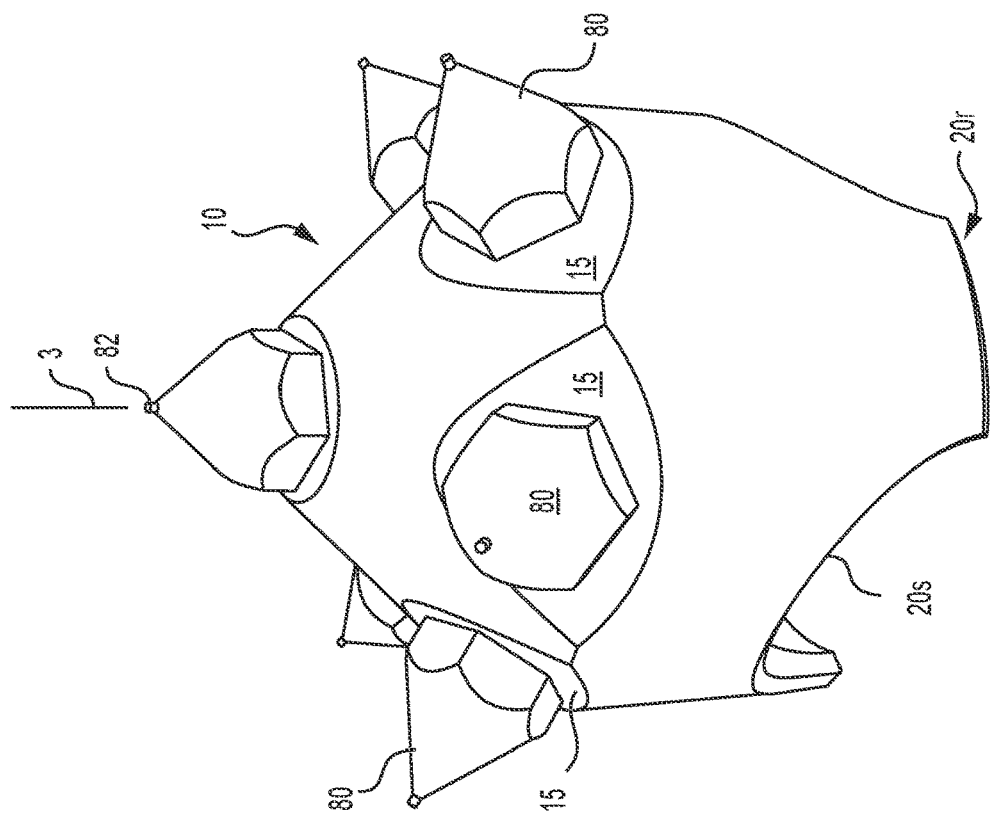
FIG. 1 shows a top perspective view of an impact head with projections.

If the core section is truncated to form a frustum shape as in FIGS. 1-10, an additional projection 80 is provided at or near the apex of the cone and a carbide tip 82 is provided on the projection 80 as shown in FIG. 1, for example. Alternatively, the conical section may have a carbide tip 82 located directly at the tip of the conical section as shown in FIGS. 15-22. This carbide tip extends colinearly with the axis 3 of the core section. This axial carbide tip 82 together any two peripheral tips 82 form a triangle and ensure that no more than three carbide tips will make initial contact with glass. When impacting glass, if one or two of the three tips 82 in a triangle contact the glass surface, the device will have a natural pivot or snap movement as the first two tips 82 make contact increasing head speed of the third tip so the force applied by the tips is enhanced. In the rare instance where all three tips 82 strike simultaneously an evenly distributed force will be applied in opposing directions. In all instances, breaking force is enhanced.

Notably, the smooth cylindrical mass section 16 of the impact head 16 also provides a broad face for secondary impact to enhance glass breakage. As noted, the carbide-tipped projections will contact the glass first, but the cylindrical mass section 16 will make a secondary impact along a broad face to apply additional glass-breaking force. A glass-breaking tool with a broad cylindrical face will provide superior performance compared to a tool with a cylindrical collar because the broad face allows for more surface area to be in contact with the glass. This increased surface area allows for more force to be applied to the glass, making it easier to break.

The cylindrical collar, on the other hand, has a much smaller surface area in contact with the glass, so less force can be applied. As a result, it may take more hits or require more force to break the glass using a tool with a cylindrical collar. Additionally, a tool with a broad cylindrical face is less likely to slip or slide when striking the glass, as there is more surface area in contact with the glass. This provides greater control and accuracy when breaking the glass. Overall, a glass-breaking tool with a broad cylindrical face is generally more effective and easier to use than a tool with a cylindrical collar because of the increased surface area and better grip.

When encountering safety glass that has shattered, the glass-breaking tool rake is designed to safely and effectively remove broken glass shards from a surface after a window or other type of glass has been broken. The user would hold the handle of the tool and carefully slide the rake potions 20r, 120r across the surface of the broken glass. The rake portion a move across the surface, the rake portions will catch on the shards of glass and lift them up, allowing the user to easily remove them from the surface.

Figure 14:
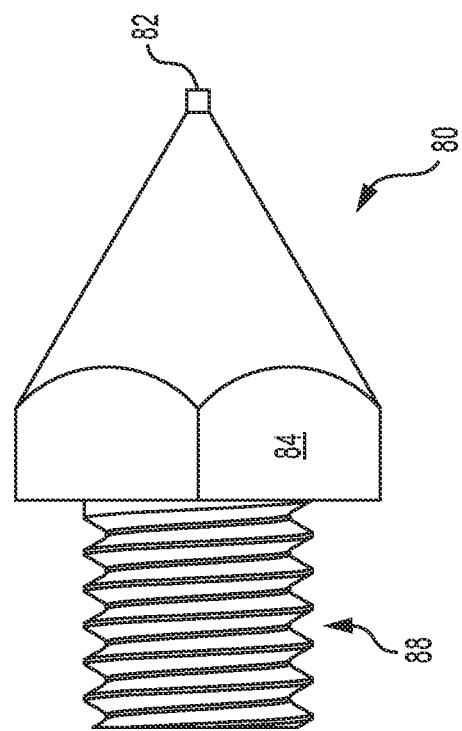
FIG. 14 shows an alternative side view of a threaded projection.
Figure 13:
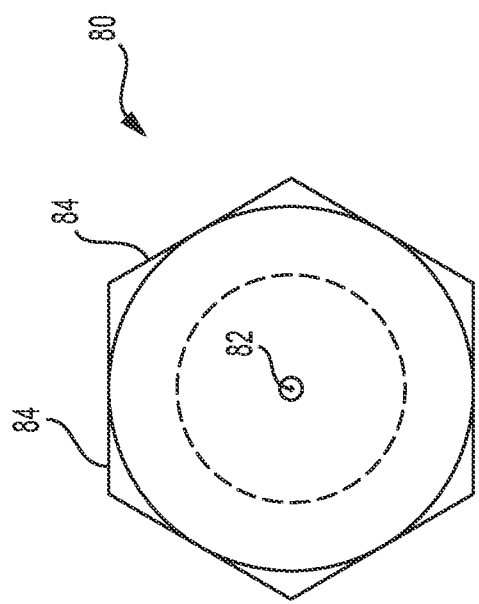
FIG. 13 shows a top view of a threaded projection.
Figure 16:
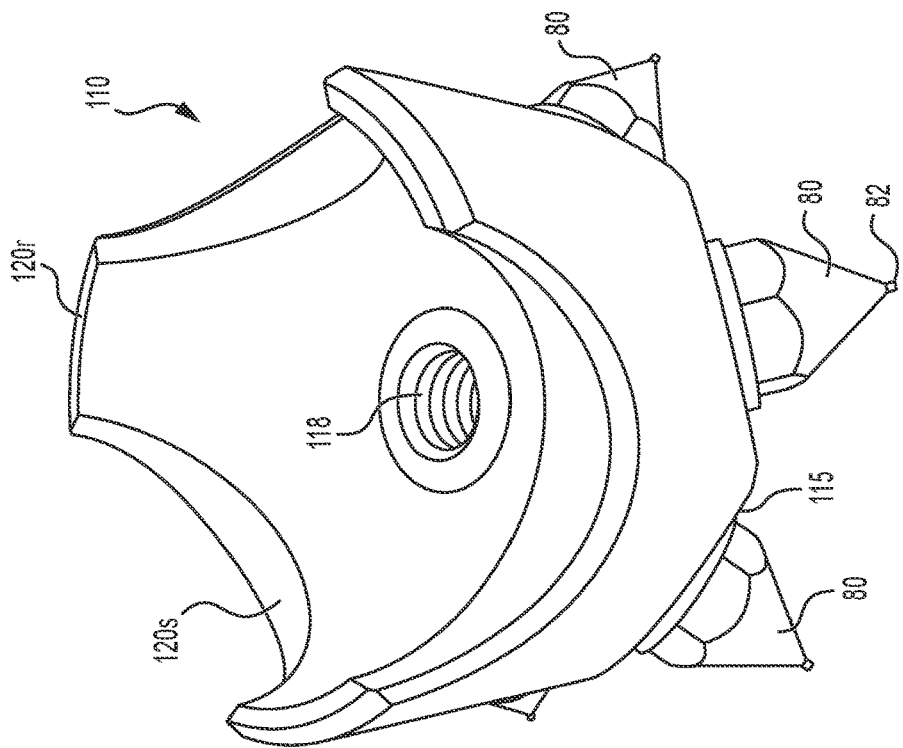
FIG. 16 shows a bottom perspective view of the alternative impact head with projections.
Figure 15:
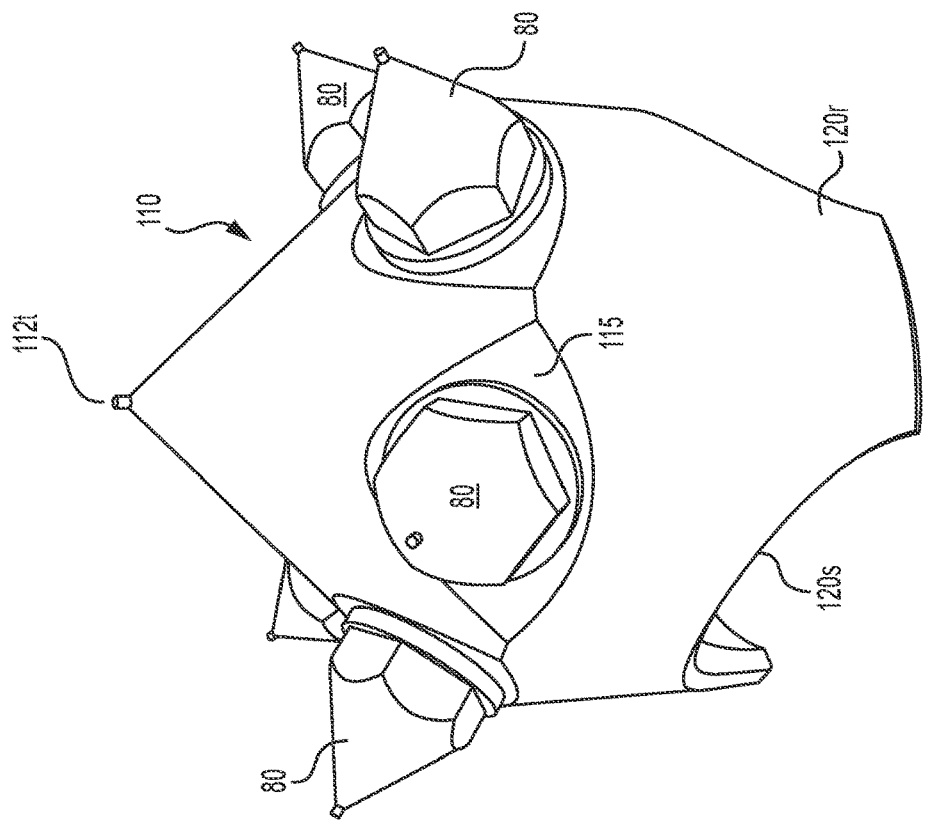
FIG. 15 shows a top perspective view of an alternative impact head with projections.

The projection base portion 12, 112 includes an array of planar projection supports 15, 115 arranged, preferably evenly spaced, around the conical portion 12, 112 so as to provide a planar support for the projections 80. A threaded opening 14, 114 is preferably perpendicular to and extends into the planar support 15, 115. As shown in FIG. 14, for example, the projections 80 have a flat base that conforms to the planar support 15, 115. A washer may be provided to ensure a tight fit.

As noted, impact tools use kinetic energy to break glass. Translational kinetic energy of a body is equal to one-half the product of its mass, m, and the square of its velocity, v, or ½mv2. As such, it is advantageous to optimize mass and velocity to achieve the greatest kinetic energy.

Optimizing the impact head 10 speed and swing weight in a glass-breaking device is important for ensuring that the device is able to effectively break through glass. The head speed refers to the speed at which the device strikes the glass, while the swing weight refers to the weight of the device as it swings towards the glass. To optimize the head speed, it is important to strike a balance between having enough speed to effectively break through the glass, while not being so fast that the device becomes difficult to control. One way to achieve this balance is to use materials with a high tensile strength in the construction of the device to reduce the amount of energy that is lost during the impact, allowing for a faster head speed.

In terms of optimizing the swing weight, the goal is to find a weight that is heavy enough to effectively break through the glass, but not so heavy that the device is difficult to swing. One way to achieve this is to use materials that are dense and have a high mass, such as metals, in the construction of the device. This can provide the necessary weight without adding too much bulk. Additionally, using a well-balanced design can help to distribute the weight evenly, making it easier to swing the device and improve its effectiveness.

Overall, optimizing the head speed and swing weight in a glass-breaking device requires finding a balance between these two factors using dense materials in the construction of the device, and employing a well-balanced design, it is possible to create a glass-breaking device that is both effective and easy to control.

The impact of a carbide protection tip imparts kinetic energy from the tool to the glass. So, all else being equal, a heavier head would have more kinetic energy and the impact would transfer more of that energy to the glass. However, kinetic energy is mass multiplied with velocity squared. So any increase in mass only helps so much, while any increase in head speed helps so much squared.

The kinetic energy in the impact head must be produced by the human swinging it. If you want such human to swing a heavier tool, there is a point of diminishing returns where the user will probably not be able to swing it as quickly. In addition, the heavier impact head of the tool on the far end of a shaft that acts as a lever, so a heavier head can feel heavier still, when held parallel to the ground (swing weight). Thus, it is important to optimize head speed, instead of weight. Since impact tools are designed for use by a range of human beings and driven by body action and because head speed is a more significant factor than mass, the mass should be optimized for the least powerful person likely to use the tool—or a range of impact heads of different mass could be used.

While mass and distance are factors that influence the ability to generate head speed, aerodynamic drag on the tool head is another factor to be considered. The smooth cylindrical surface of the cylindrical mass section and glass rake portion reduces aerodynamic drag.

In addition, swing weight is a measurement of how heavy a tool feels when swinging to hit a glass surface. Swing weight is a function of static weight combined with the balance or distribution of weight. Unbalanced weights are more difficult to swing. The balanced arrangement of projections along a single plane and smooth exterior surfaces improve performance. The balanced arrangement of the projections 80 and glass retraction rake portion 20r around the longitudinal axis of the tool is especially evident in FIGS. 7, 8, 19 and 20.

Laminated glass and safety glass are two types of glass that are designed to provide enhanced strength and safety in different ways.

Laminated glass often used in the windshield of autos glass, is a type of glass that is made by sandwiching a layer of plastic between two layers of glass. When laminated glass is struck with a force, the plastic layer helps to absorb the energy of the impact and prevent the glass from breaking. As a result, laminated glass is less likely to shatter and can provide better protection against impacts and intrusions.

Safety glass, on the other hand, is a type of glass that is designed to shatter into small, relatively harmless pieces when it is broken. Safety glass is used on the side and rear windows of autos. This can help to reduce the risk of injury from broken glass and make the glass safer to use in certain applications. There are several types of safety glass, including tempered glass, which is heat-treated to increase its strength and shatter resistance, and wired glass, which is made by embedding a wire mesh in the glass to hold the pieces in place if it breaks.

In general, laminated glass is more resistant to breaking than safety glass, but safety glass is designed to shatter in a safer manner if it does break. Both types of glass can be used in a variety of applications, depending on the specific needs and requirements of the situation.

The peripheral rake portion 20r of the impact heads 10, 110 can be used to push and pull away broken laminated glass. Because the tool is symmetrical, it is optimized to help safely remove the broken glass and create an opening large enough for a person to escape through. The rake portion is also useful to drag along the edge of a shattered safety glass enclosure to remove shards of glass remaining in the frame of the enclosure. Thus, the rake 20r is useful for clearing both types of laminated and safety glass after breaking.

Figure 31:
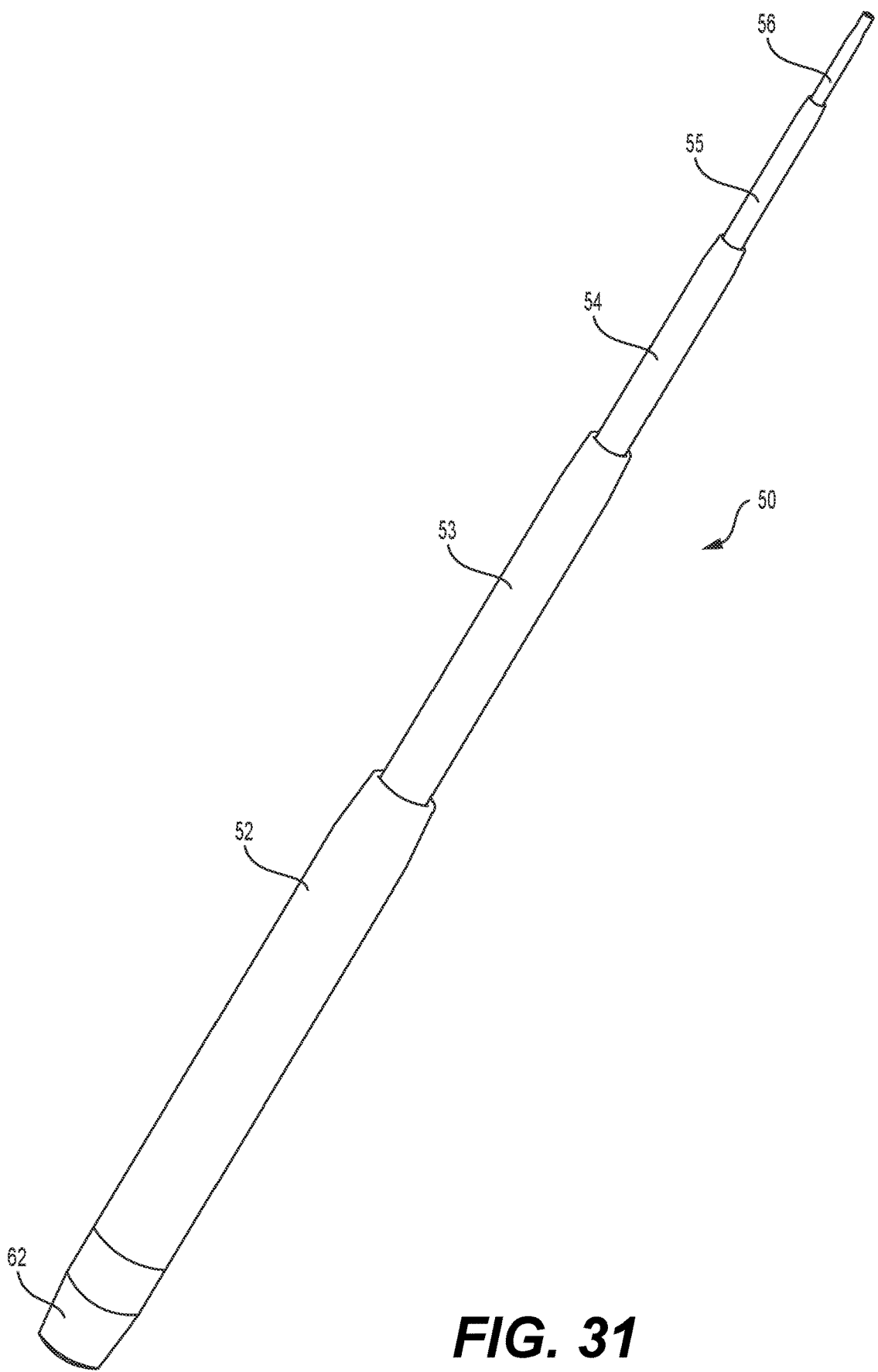
FIG. 31 is a perspective of a five section baton with a threaded opening for receiving an adapter.

All things being equal, a tools swing weight will increase as the tool's weight is shifted toward the head of the tool. If the weight shifts toward the handle, the swing weight will decrease. Therefore, a tool with a baton having additional telescoping sections is advantageous in that it allows for adjustable length to accommodate variations in user strength. FIG. 31 shows a baton 50 with five distinct sections (52-56) telescoping to enhance adjustability. Each section has an independent friction lock such that all, none or any number of the sections may be locked into an extended position. FIG. 33 shows a baton with two sections 54, 53 extended and one section 52 retracted. While the adjustable length feature provided by telescoping sections is often advantageous, the impacts heads 10, 110 described herein may used on a fixed length rubber handle or a fixed length baton.

Another factor to consider in optimizing the design of the impact head 10 is the direction of the reaction force applied by the carbide tips 82 tool on impact. Force on the tip 82 is transmitted through the projections 80 and impact head 10 to the narrow tip of the baton 50. It is advantageous to apply the force at an angle of about 35-55 degrees to the axis 3 of the tool to reduce the shearing force on the tool and resolve much of the force as a torsional force. B As shown by arrows in FIGS. 10 and 22, because of the angle of the planar surfaces 15, 115 the impact force on the projections 80 is transmitted to the threaded connector at a location that minimizes torsional force on the baton because the forced is applied on the base of the threaded portion.

Figure 34:
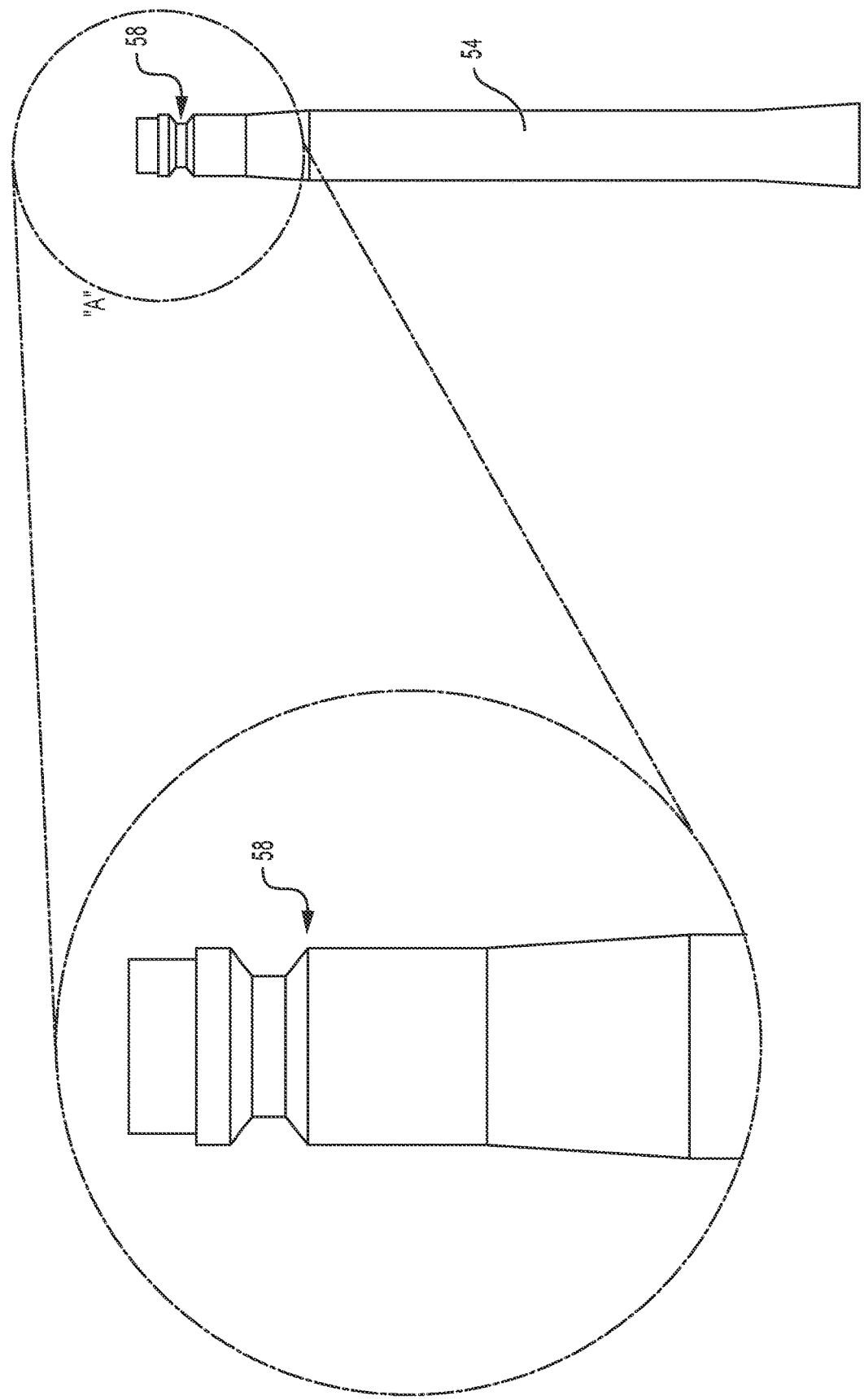
FIG. 34 is a detail view of the button construction at the tip of a baton or handle that is made of rubber, plastic or metal.

Embodiments of the invention provides an attachment that transforms an ordinary police baton into a swingable glass-breaking tool that allows application of much greater force (impact energy) than known designs. As shown in FIGS. 32 and 33, a button adapter is designed to attach to a button of the type often provided at extended end of an ordinary police baton. Police batons (for instance ASP and Monadnock are common police batons) commonly include a bulbous button at the tip, one example of which is shown in FIG. 34. Police generally cannot breach glass on the first hit and usually take multiple hard hits ultimately to break through glass because force must be applied along the length of the baton (longitudinally).

As shown in FIGS. 32 and 33, the button adapter slides over the extended end of a police baton. A compression sleeve is advantageous for this purpose. The impact head attached (such as by snapping) into place over the bulbous baton ball at the end of the baton 50, while the shaft of the Scepter holds the device more securely to the shaft of the baton, helping to stabilize the piece onto the baton as it strikes glass.

The button adapter head snaps over the baton ball, and the shaft provides greater holding strength to the baton because it is firmly attached to the baton shaft. There are numerous alternative methods to hold the impact head to the baton including the following exemplary embodiments. The first method utilizes a wing-nut screw to secure the sleeve to the baton shaft. The second method utilizes a curved latch that clamps tightly around the baton shaft. The third method utilizes a shaft that twists closed over an underlying threaded tube, which clamps onto the baton tightly. The internal surface of the shaft can hold a rubberized material which will help secure the device to the baton shaft to prevent slipping. A fourth method utilizes a hinge on the Impact head adapter shaft, which allows the sleeve to open in a perpendicular position from the baton shaft, allowing the Impact head adapter head to be snapped over the baton head, then the Impact head adapter shaft (sleeve) is closed down over the baton and snapped and secured into a closed position over the baton shaft. A fifth method requires the end button on the police baton to be removed. The Impact head adapter head has a threaded screw protruding down from the under side of the head, which will screw directly into the open threads inside the end of the police baton. The Impact head adapter would also have a shaft that slides over the open baton shaft to provide stability, and may or may not require any type of clamping to the baton shaft.

The entire product can be made either from steel, other hardened metal, ceramic or a composite material hard enough to withstand blows onto glass and hard enough to hold the spikes.

Other structures may be used to secure the sleeve to the baton including a quick release over center clamp, compression fittings such as those that include an inner sleeve with fingers compressed inwardly by an outer sleeve threaded on moved longitudinally relative to the inner sleeve.

From the foregoing, the significance of the design features detailed in the drawings will be evident. FIG. 1 and FIG. 2 show perspective views of an impact head 10 with six peripheral projections 80 and an axial projection. As shown, the peripheral projections are all secured to planar surfaces 15 provided on the impact head 10 and the axial projection is secured to the planar surfaced of the truncated conical portion of the impact head 10. The peripheral surface of the impact head below the conical portion is a smooth cylindrical surface that extends to equally spaced rake portions 20r formed by scalloped cuts 20s in the cylindrical surface. The impact head includes an axially aligned threaded opening 18 for receiving a threaded connection to an adapter or baton.

Figure 4:
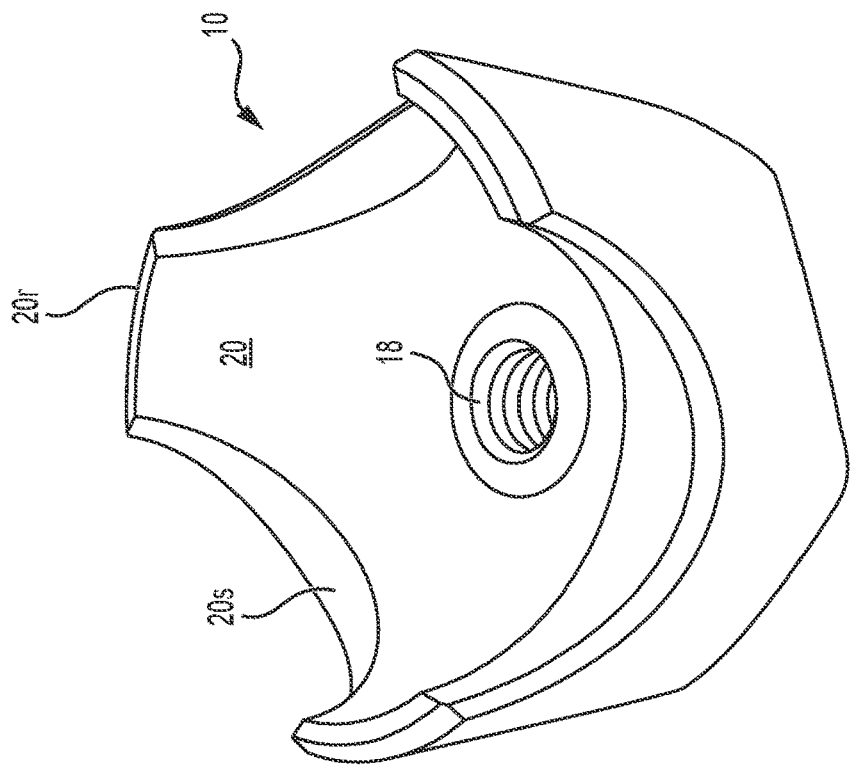
FIG. 4 shows a bottom perspective view of an impact head.
Figure 3:
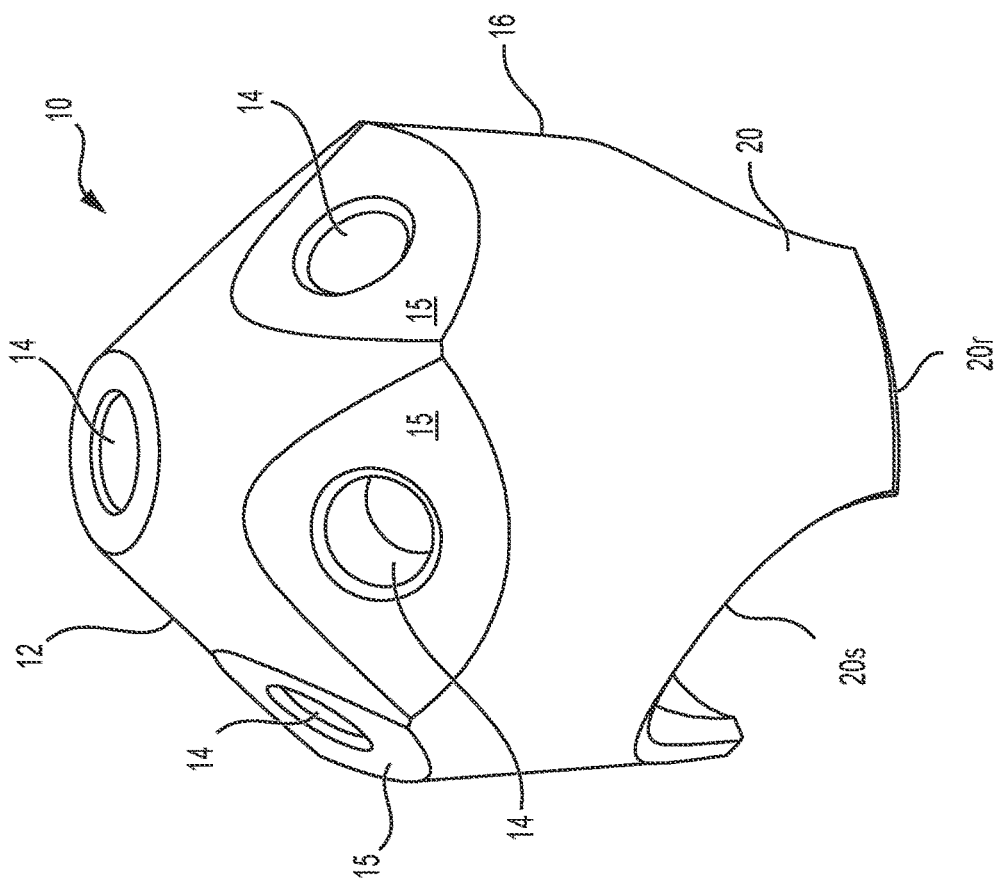
FIG. 3 shows a top perspective view of an impact head.

FIG. 3 and FIG. 4 show perspective views of an impact head without projections 80. As shown, threaded openings 14 are provided to receive the threaded portion 88 of the projections 80. The projections have a hex nut surfaces 84 that allow the projections 80 to be tightened into or loosed from the impact head 80 with a wrench. The six equally spaced planar surfaces 15 are each provided as a planar section through the conical portion 12 of the impact head 10. As shown in FIG. 3 the resulting planar surfaces 15 have hyperbolic upper edges. The planar surfaces 15 are tilted downward from the conical surface of portion 12 so that projections mounted on the planar surfaces 15 extend at a greater interior angle than the angle of the conical surface of portion 12.

Figure 6:
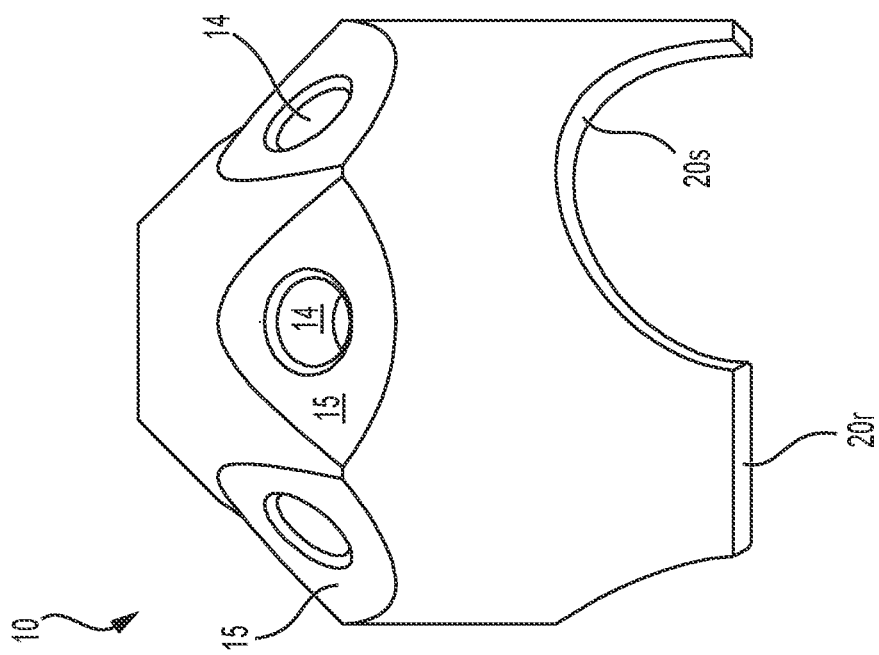
FIG. 6 shows an alternative side view of an impact head.
Figure 5:
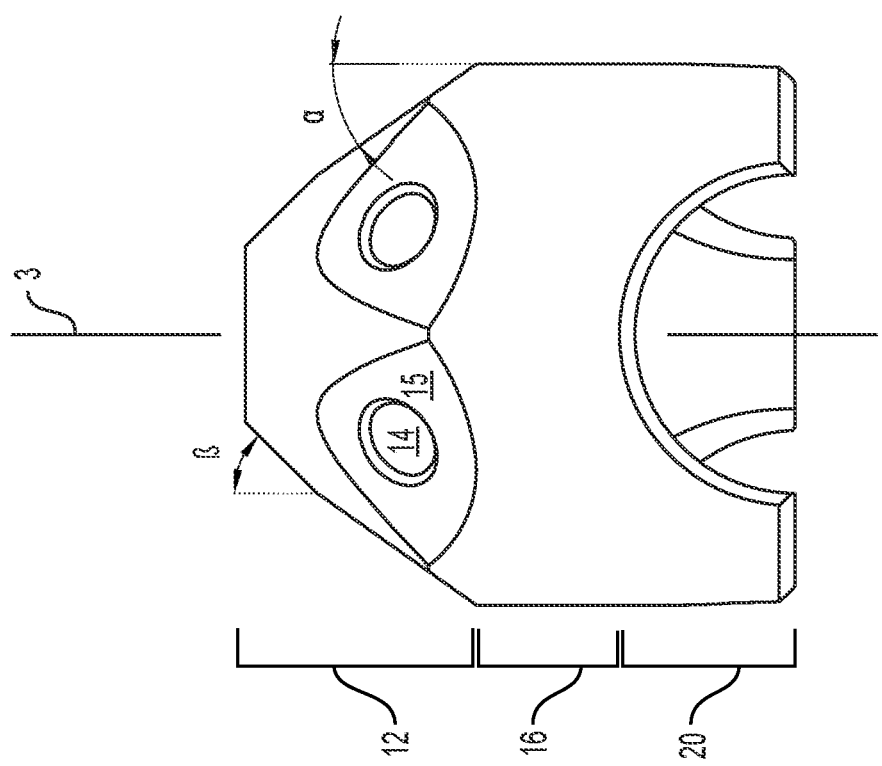
FIG. 5 shows a side view of an impact head.

FIGS. 5 and 6 show side views of the impact head 10. FIG. 5 illustrates the demarcation between the conical section 12, the cylindrical central mass 16 and the scalloped rake portion 20. The angle of the conical surface $\beta$ and angle $\alpha$ of the planar surfaces are also indicated. In the example shown, the exterior angle of the conical surface $\beta$ is about 45° and exterior angle $\alpha$ is about 35°

Figure 8:
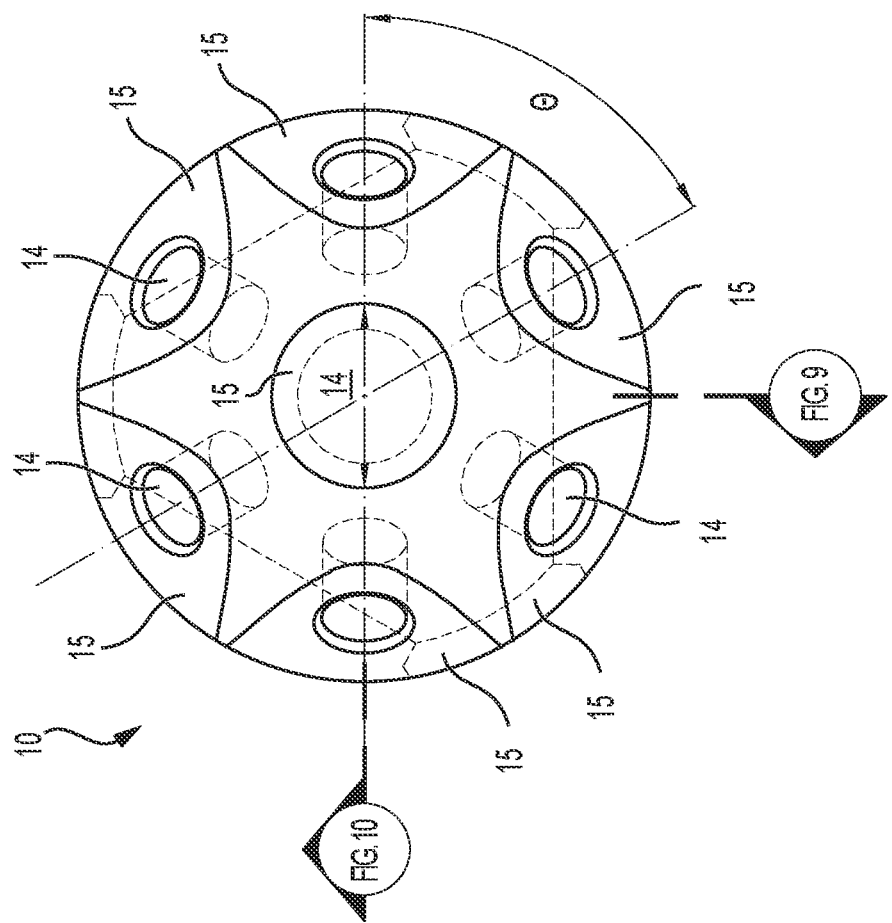
FIG. 8 shows a top view of an impact head.
Figure 7:
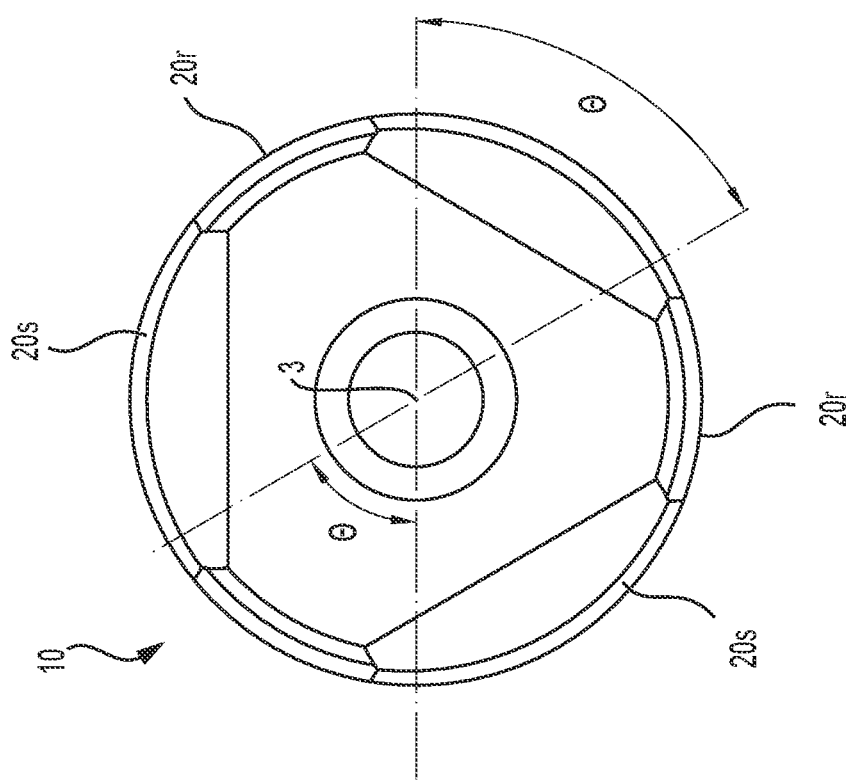
FIG. 7 shows a bottom view of an impact head.

FIG. 7 shows a bottom view of an impact head and FIG. 8 shows a top view of an impact head. In these views the balanced alignment of the threaded openings 14 that receive projections 80 and rake portions is evident. As shown, the openings 14 are centered at an angle $\Theta$ from each other—in this example, theta is 60°.

Figure 10:
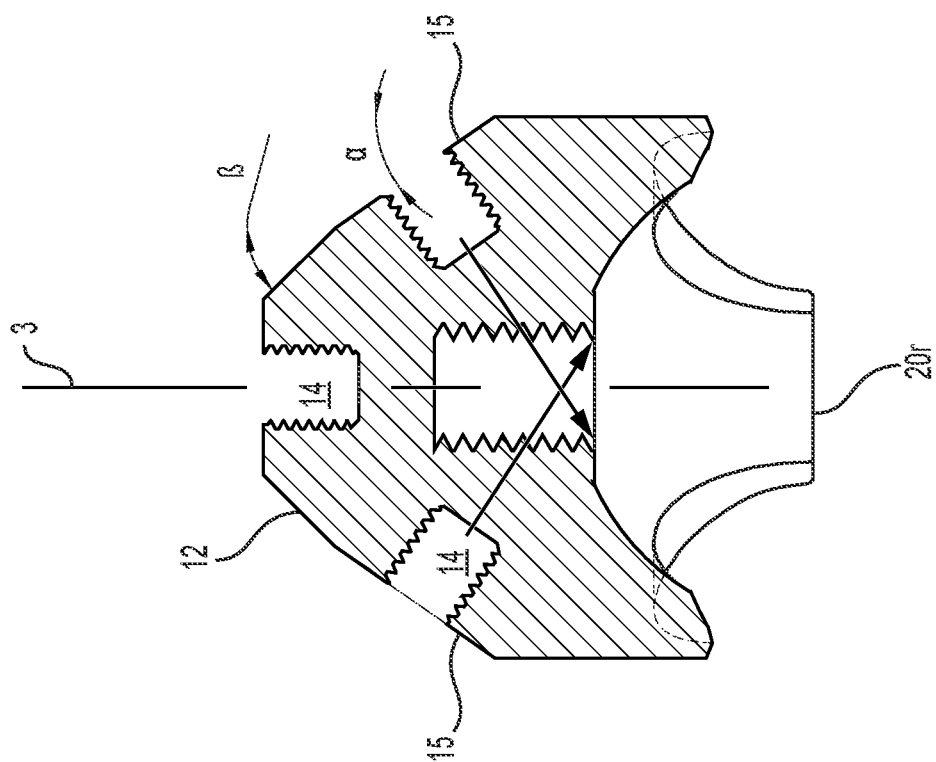
FIG. 10 shows an alternative sectional side view of an impact head.
Figure 9:
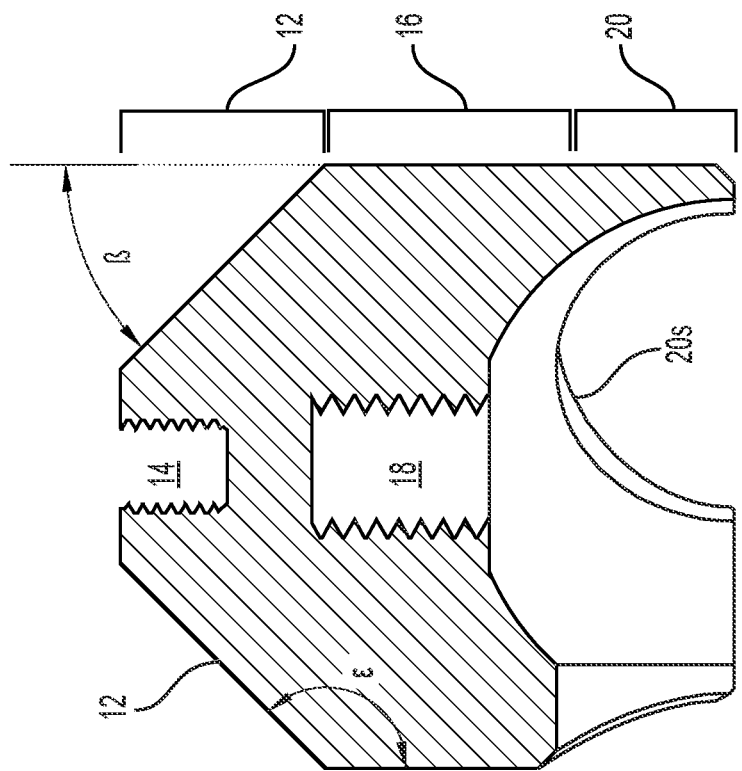
FIG. 9 shows a sectional side view of an impact head.
Figure 12:
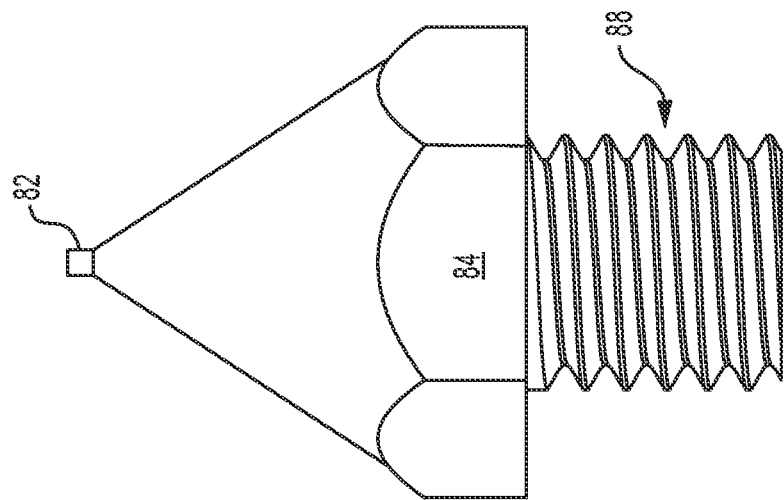
FIG. 12 shows a side view of a threaded projection.
Figure 11:
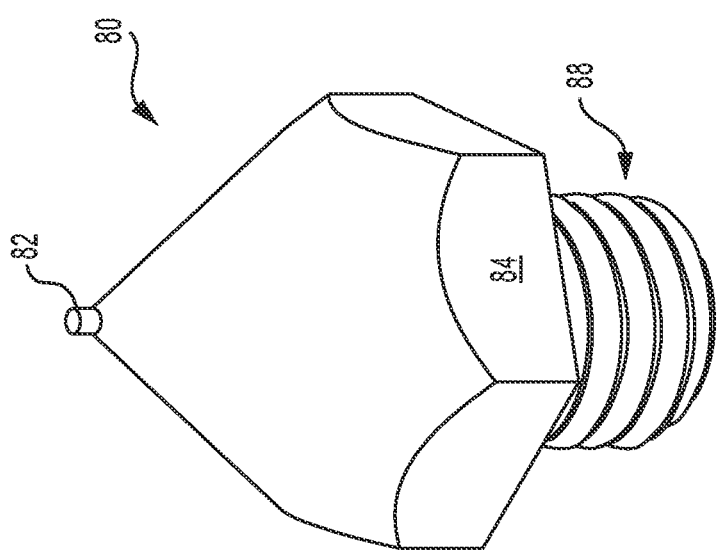
FIG. 11 shows a top perspective view of a threaded projection.

FIGS. 9 and 10 show sectional side views of an impact head 10. FIG. 9 again illustrates the demarcation between the conical section 12, the cylindrical central mass 16 and the scalloped rake portion 20. The angles of the conical surface $\beta$ and angle $\alpha$ of the planar surfaces are also indicated. In the example shown, the angle of the conical surface $\beta$ is 45° and angle $\alpha$ is 55°. The angle E is supplementary to angle $\beta$ (i.e., $\varepsilon=180°-\beta$). As shown, the planar surfaces 15 are tilted downward from the conical surface of portion 12 so that projections mounted on the planar surfaces 15 extend at a greater included interior angle than the angle of the conical surface of portion 12. The angle α should be greater than 45° and less than 90° preferably 55-75° to ensure optimal impact.

FIGS. 11-14 show various views of a threaded projection 80 that includes a carbide tip 82. The thread 88 in openings 14 in the impact head 10. Above the threaded portion 88, the projection in generally conical, but flat hex surfaces 84 are provided at the base of the projection 80 so that a socket wrench or similar tool can be used to tighten or loosen; the projection 80 from the impact head 10.

Figure 18:
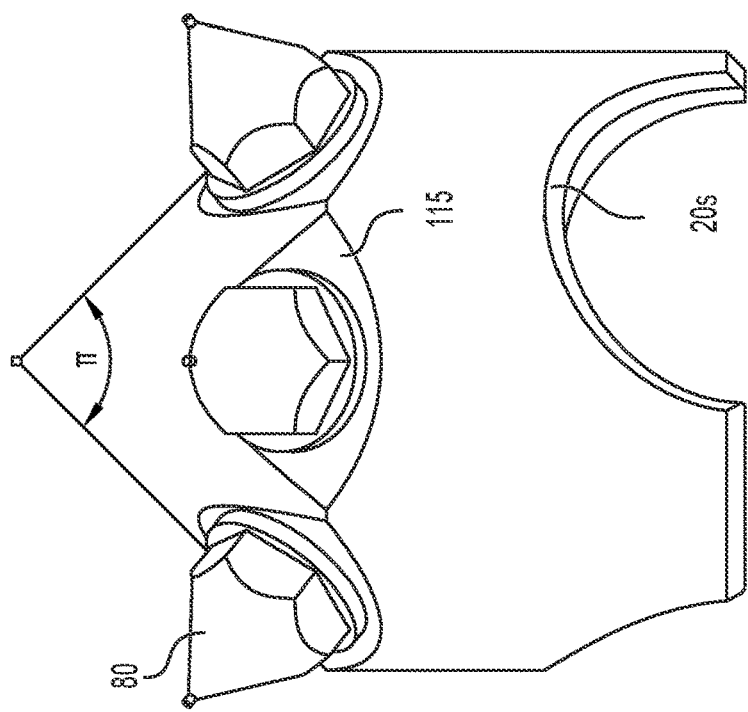
FIG. 18 shows an alternative side view of the impact head of FIG. 15.
Figure 17:
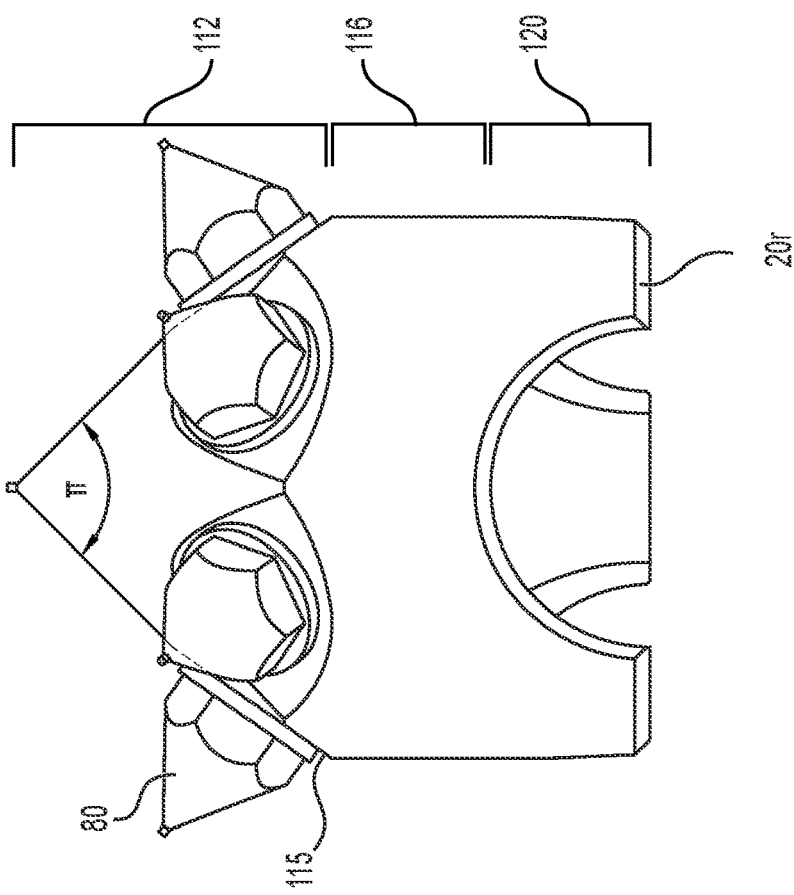
FIG. 17 shows a side view of the impact head of FIG. 15.
Figure 20:
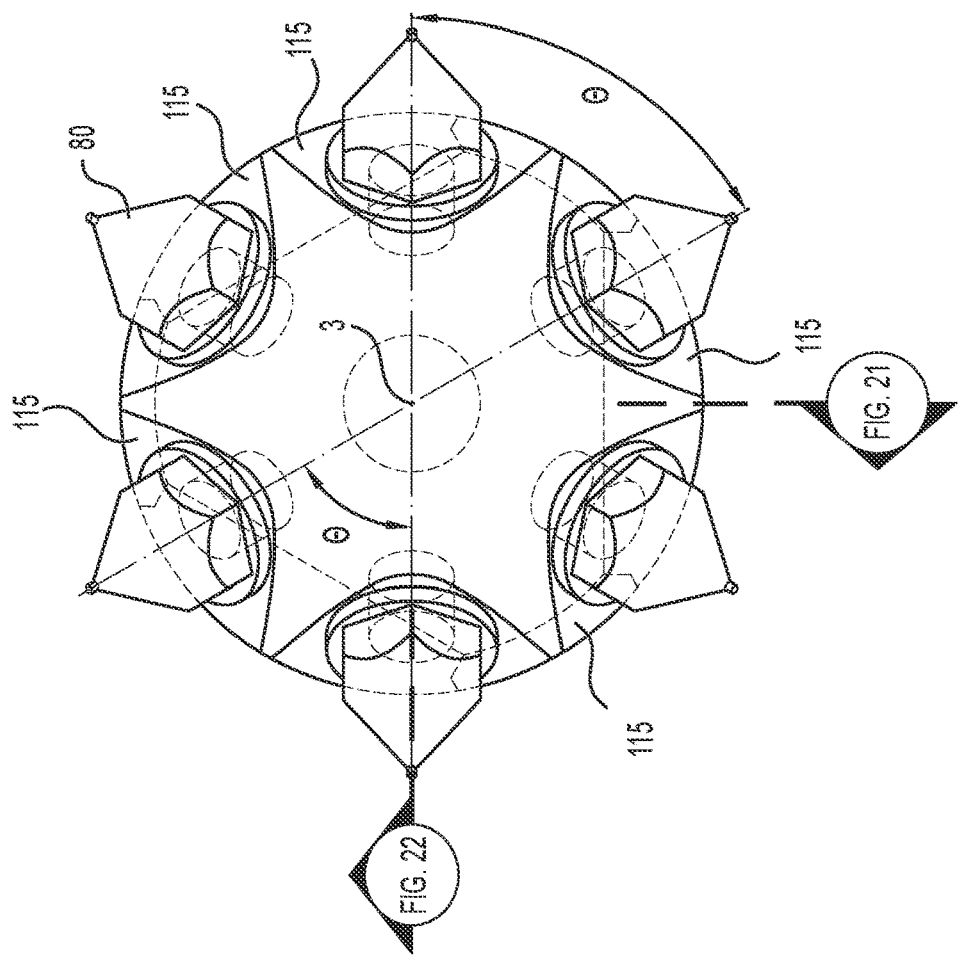
FIG. 20 shows a top view of the impact head of FIG. 15.
Figure 19:
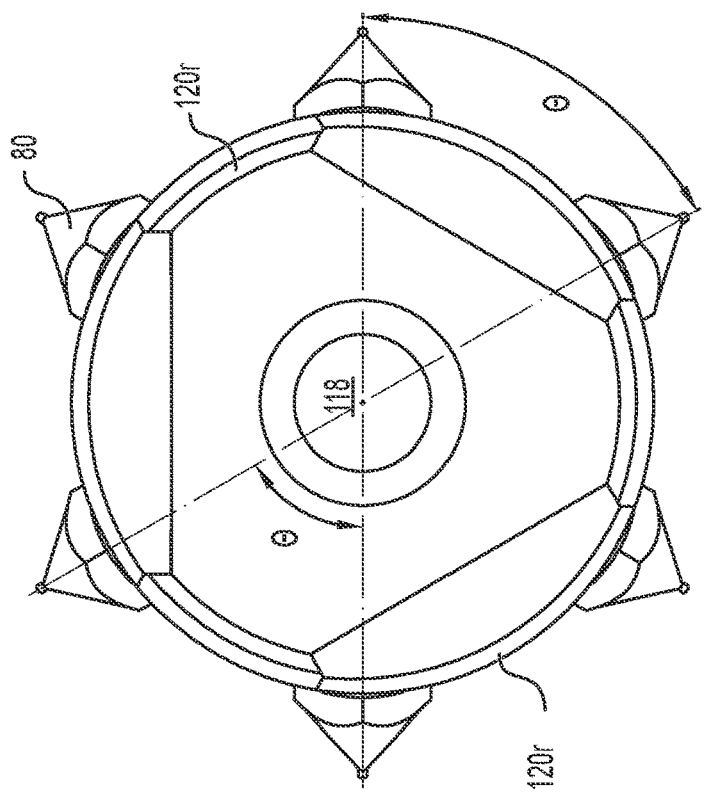
FIG. 19 shows a bottom view of the impact head of FIG. 15.
Figure 22:
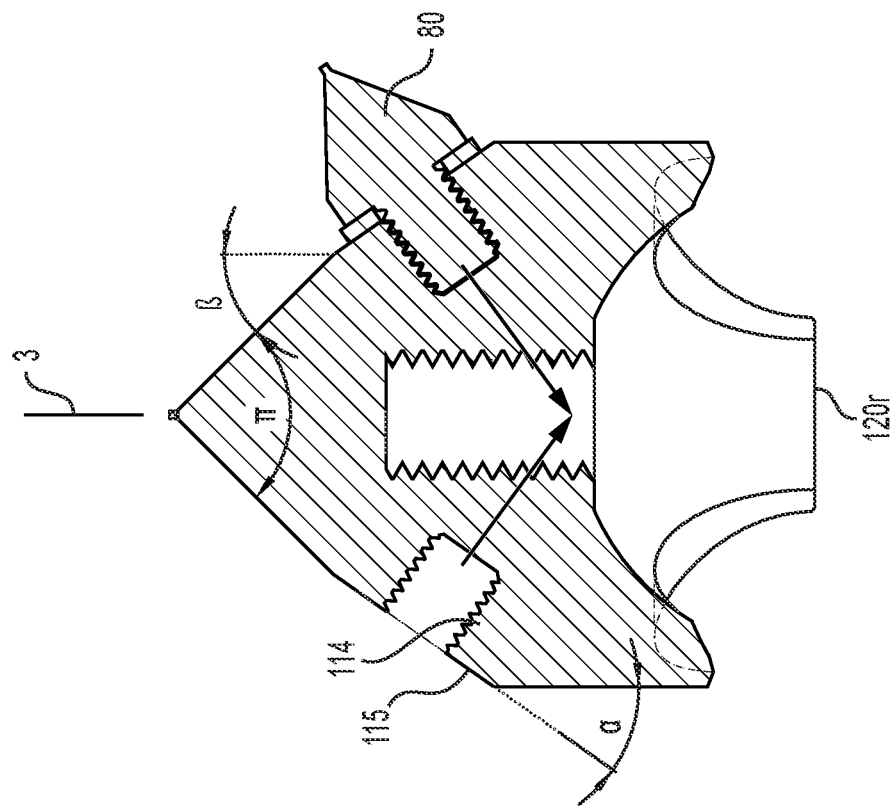
FIG. 22 shows an alternative sectional side view of the impact head of FIG. 15 along the lines shown in FIG. 20.
Figure 21:
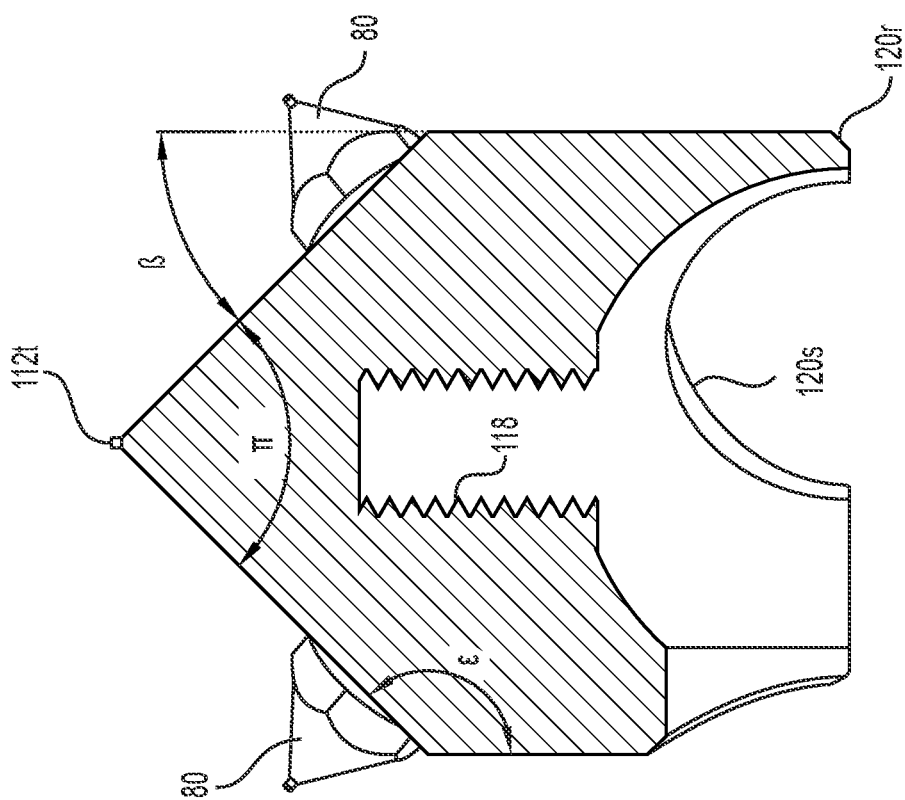
FIG. 21 shows a sectional side view of the impact head of FIG. 15 along the lines shown in FIG. 20.
Figure 26B:
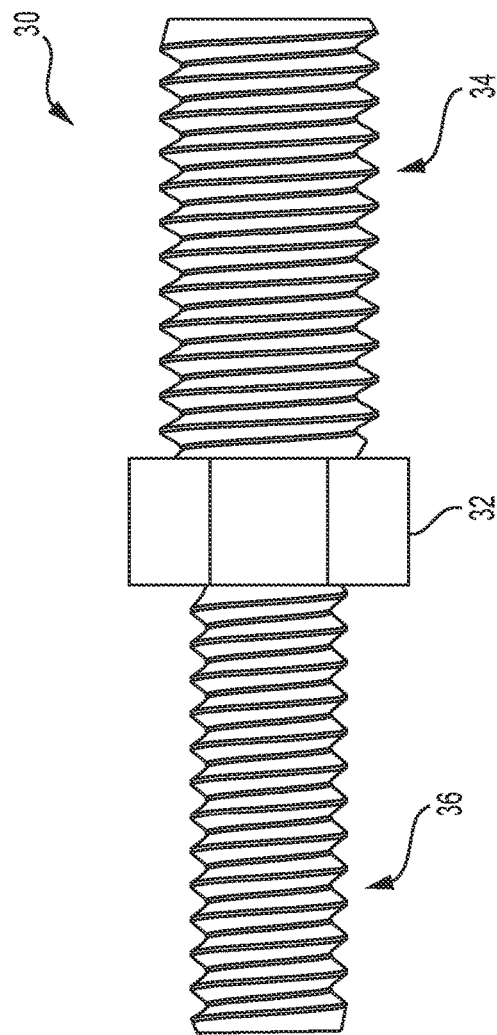
FIG. 26B shows a side view of the adapter of FIG. 26A.
Figure 27B:
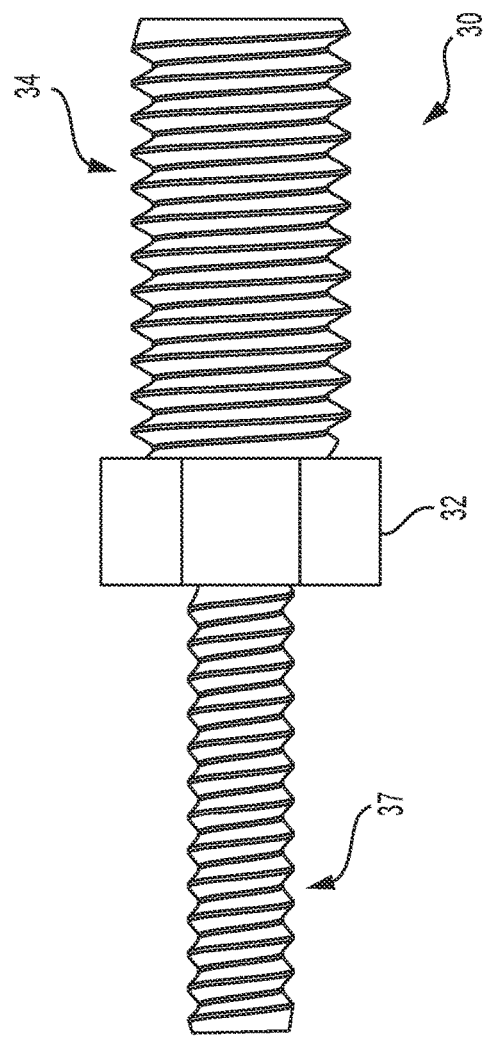
FIG. 27B shows a side view of the adapter of FIG. 27A.
Figure 26A:
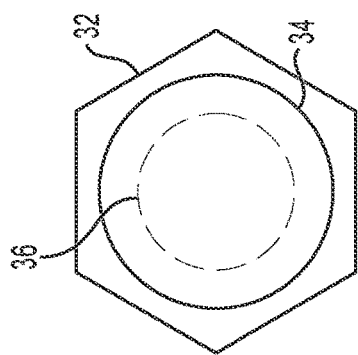
FIG. 26A shows a bottom view of an adapter.
Figure 27A:
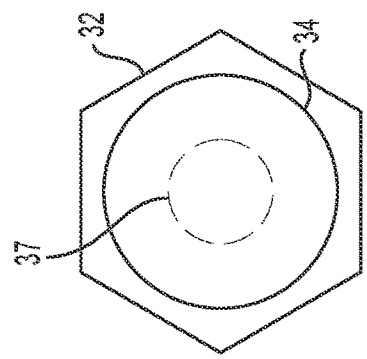
FIG. 27A shows a bottom view of an adapter.

FIGS. 15-22 show various views of an alternative impact head 110 with projections 80. The impact head 110 is nearly identical to the impact head 10 with similar features labeled with the same reference numeral or the same reference numeral preceded by 1. The difference between impact head 110 and impact head 10 is that instead of an axial projection 80, the conical portion 112t of impact head 110 extends to the apex of the cone (i.e., the cone is not truncated) and the axial carbide tip 82 is provided directly into the tip of the impact head 110. As shown in FIGS. 17 and 18, the conical portion is angled at an angle Π that is preferably 45°). As shown, the planar surfaces 115 are tilted downward from the conical surface of portion 112 so that projections mounted on the planar surfaces 115 extend at a greater interior angle than the angle of the conical surface of portion 112. FIG. 117 illustrates the demarcation between the conical section 112, the cylindrical central mass 116 and the scalloped rake portion 120.

FIGS. 23-25 show various views of a baton 50 with three telescoping sections 52, 53, 54. The sections of the baton may be made of metal or a non-metallic material such as rubber or plastic. The sections have tapered ends to provide a friction lock that allows any section to be locked into an extended position or pushed into a retracted position. The baton includes a seat belt cutter 64 covered by a cap 62. The distal section 54 includes an external thread 57 to allow attachment with an impact head 10, 110. An alternative design has an internal thread that receives a threaded adapter 30. As shown in FIG. 24, the distal end 54 is solid. Such a solid section may be used by itself as a short handle according to an embodiment of the invention. The solid handle 54 may be formed of impact absorbing rubber or plastic, or metal.

A rubber or plastic handle 54 can absorb impact force better than a metal handle due to the ability of rubber and certain plastics to deform upon impact. Deformation allows the handle to absorb some of the energy from the impact, reducing the amount of force that is transmitted to the user's hand. In contrast, a metal handle does not have this ability to deform and therefore transmits more of the impact force to the user's hand. Additionally, the rubber or plastic handle may have some additional shock-absorbing properties, such as a higher level of friction, which can further reduce the amount of force transmitted to the user's hand.

The impact heads 10, 110 described herein can be a standalone unit that can be quickly screwed onto the end of a standard police baton, such as an ASP baton, using a quick release/attachment device or threaded adapter 30.

Details of the threaded adapter 30 are illustrated in FIGS. 26A-27B. The threaded adapter 30 is a device that is used to connect a baton 50 and impact head 10, 110 when the parts have different thread sizes or types. The threaded adapter 30 consists of two threaded sections 34 and 36 or 37 that are separated by a nut 32. The first threaded section 34 is designed to fit onto the standard opening 18 of the impact head 10, 110, while the second threaded section 36 or 37 is designed to fit into the internal thread of a baton. The nut 32 serves to secure the two parts together by applying pressure to the threads of both sections.

The purpose of a threaded adapter 30 is to allow for a secure connection between two parts that would otherwise not be compatible due to differences in their threading. To use a threaded adapter, one simply needs to attach it to the first part 10, 110 by screwing it on to the appropriate threading, and then attach the second part 50 to the adapter by screwing it onto the second threaded section. The nut can then be tightened to secure the connection and ensure that the two parts are held together firmly.

Figure 28:
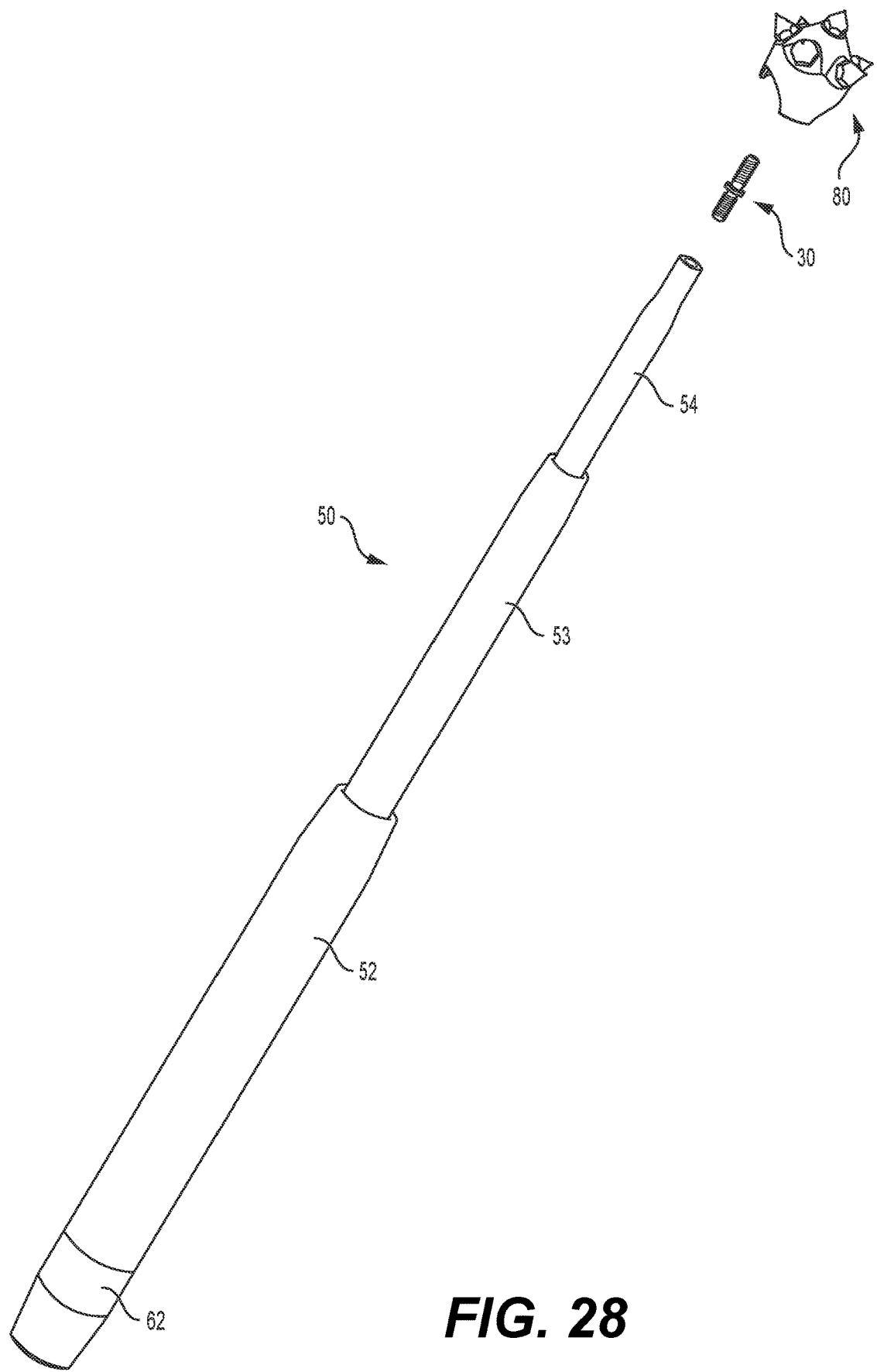
FIG. 28 is an exploded perspective view of a glass breaking tool.
Figure 29:
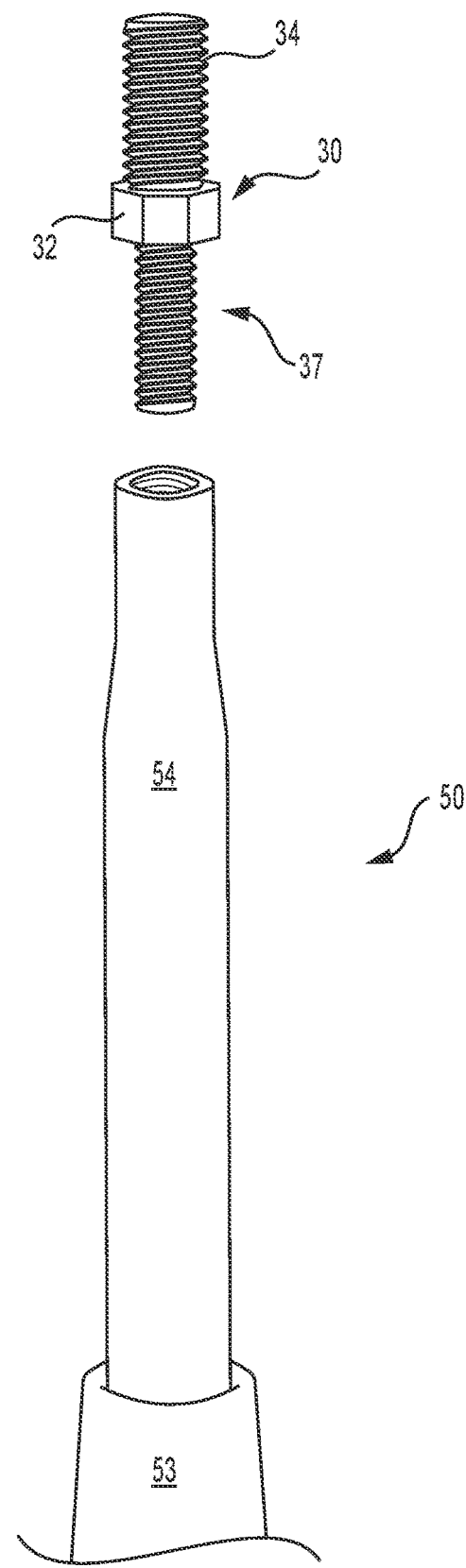
FIG. 29 is a detail perspective view of the tip of a baton and adapter.
Figure 30:
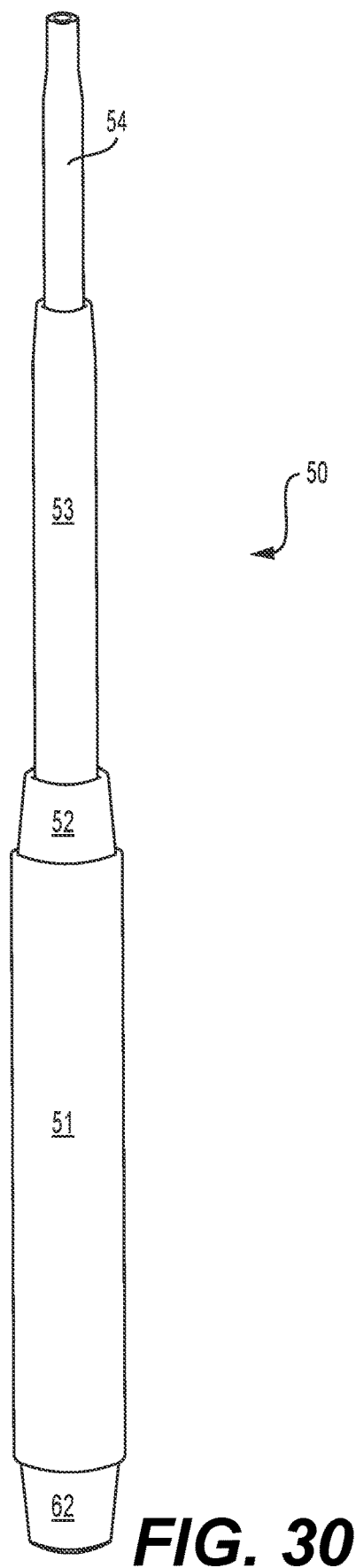
FIG. 30 is a side perspective of a baton with a threaded opening for receiving an adapter.

FIG. 28 is an exploded perspective view of a glass breaking tool that includes a multi-section baton, a threaded adapter 30 and an impact head 10. FIG. 29 is a detail perspective view of the tip of a baton and adapter 30. FIG. 30 is a side perspective of a baton with a threaded opening for receiving an adapter.

FIG. 31 is a perspective of a five-section baton with a threaded opening for receiving an adapter, The five sections 52, 53, 54, 55, 56 are each independently retractable and friction lockable into an expanded position. The effective length of the baton can be readily modified by retracting any, all or none of the sections. The most distal section—here 56—includes a threaded section (internal or external) to allow connection to an impact head. 10, 110.

FIGS. 32 and 33 are partial sectional side views of a glass-breaking device that includes retractable lockable baton sections 52, 53, 54, an impact head 10 and a button adapter to connect to the distal button type quick connect fitting 58 of a police baton. FIGS. 34-37 depict details of components of the glass-breaking device shown in FIGS. 32 and 33.

FIG. 34 is a detail view of the button construction at the tip of a baton or handle that is made of rubber, plastic or metal. The baton or handle detail may be used in a stand-alone handle or on the distal end of a telescoping baton.

As shown, the baton 50 button is in the form of a quick connect fitting 58 that snaps into a complementary fitting in a threaded adapter or directly into an impact head. The quick connect fitting includes a male and female component, each with a circular fitting that can be locked together by spring detents. The male fitting has a protruding stem that fits into the female fitting, and the detents holds the two fittings in place by compressing the stem. To release the connection, the latch can be easily opened by mechanical action to allow the detents to retract, allowing the two fittings to be separated quickly and easily.

Various Reference Numerals have been used in this description and in the drawings, for quick reference, these are: 10 Impact Head; 12 Conical or partially conical section; 14 Threaded Opening; 15 Planar Projection support surface; 16 Cylindrical Mass Section; 18 Threaded Adapter opening; 20 Glass Rake Portion; 20r Rake extension; 20s Rake scallop; 30 Adapter; 32 Central nut portion; 34 First threaded Portion; 36 Second Threaded Portion; 37 Third Threaded portions; 50 Baton; 52 First telescoping section; 53 Second telescoping section; 54 Third telescoping section; 55 Fourth telescoping section; 56 Fifth telescoping section; 57 Thread; 58 Button/Quick Connect; 60 Threaded opening; 62 Cap; 64 Seat belt Cutter; 80 projection; 82 carbide tip; 84 planar hex surfaces; 88 threaded extension. In FIG. 9-16—A different embodiment with solid conical tip instead of projection: 110 Impact Head; 112 Conical or partially conical section; 112t conical tip with carbide tip 82; 114 Threaded Opening; 115 Planar Projection support surface; 116 Cylindrical Mass Section; 118 Threaded Adapter opening; 120 Glass Rake Portion; 120*r* Rake extension and 120*s* Rake scallop.

The invention claimed is:

1. A glass breaking tool with an impact head that extends along a longitudinal axis from a first axial end to a second axial end and a handle attached to the second axial end of the impact head;
the impact head having a cylindrical mass section extending along the longitudinal axis, a conically tapered section that extends from a first end of the cylindrical mass section conically toward the first axial end of the impact head; a rake portion with a cylindrical periphery extending from a second end of the cylindrical mass portion that is opposite the first end of the cylindrical mass portion;
wherein a plurality of planar projection support surfaces are provided on the conically tapered section of the impact head, the plurality of planar projection support surfaces are spaced around the periphery of the conically tapered section, wherein a threaded opening is provided on each of the plurality of planar projection support surfaces, each of the threaded openings have a thread axis that extends perpendicular to a respective one of the planar projection support surfaces, the thread axes of the plurality of the threaded openings intersecting the longitudinal axis of the impact head at a single point where an included angle at the point of intersection being greater than 45 degrees and less than 90 degrees;
a plurality of peripheral projections, each projection including a conical spike portion at one longitudinal end and a threaded portion at the other longitudinal end, wherein the conical spike portion supports a carbide tip and the threaded portion is threaded into a respective threaded opening of the plurality of planar projection surfaces, wherein the plurality of peripheral projections are spaced around the periphery of the impact head such that the peripheral projections are coplanar and the carbide tips of the spaced apart peripheral projections are located on a common plane that is perpendicular to the longitudinal axis of the impact head;
the impact head further including handle attachment structure to attach the handle to the second axial end of the impact head.

2. The glass breaking tool according to claim 1, wherein the plurality of peripheral projections each include a nut section between the conical spike portion and the threaded portion, the nut section including planar hex surfaces to facilitate threading the threaded portion into and out of the respective threaded opening.

3. The glass breaking tool according to claim 1, wherein the rake portion comprises a plurality of rake sections spaced around the periphery of the impact head, the rake sections having partially cylindrical peripheral surfaces.

4. The glass breaking tool according to claim 1, wherein the handle is made of a solid, non-metallic viscoelastic materials that absorbs vibration.

5. The glass breaking tool according to claim 1, wherein the handle is made of rubber to absorb impact force.

6. The glass breaking tool according to claim 1, wherein the handle is a telescoping handle that has at least three telescoping sections.

7. The glass breaking tool according to claim 1, wherein the handle is a telescoping handle that has at least three sections that include friction locks to allow a user to adjust the length of the handle.

8. The glass breaking tool according to claim 1, wherein the attachment structure is a threaded connection.

9. The glass breaking tool according to claim 1, wherein the attachment structure is a quick release connection.

10. The glass breaking tool according to claim 1, further comprising a carbide tipped axial projection at the first axial end of the impact head.

11. The glass breaking tool according to claim 1 further comprising a threaded adapter that connects the impact head to the handle, the threaded adapter including two dissimilar threaded portions.

12. A glass breaking tool comprising:
a) an impact head that extends along a longitudinal axis from a first axial end to a second axial end;
b) a handle attached to the second axial end of the impact head;
c) the impact head comprising a cylindrical mass section that extends along the longitudinal axis, a conically tapered section that extends from a first end of the cylindrical mass section conically toward the first axial end of the impact head, and a rake portion with a cylindrical periphery extending from a second end of the cylindrical mass portion that is opposite the first end of the cylindrical mass portion;
d) a plurality of planar projection support surfaces provided on the conically tapered section of the impact head, the plurality of planar projection support surfaces are spaced around the periphery of the conically tapered section, each planar projection support surface of the plurality of planar projection support surfaces having a threaded opening with a thread axis that extends perpendicular to the respective planar projection support surface and intersects the longitudinal axis of the impact head at a point where an included angle at the point of intersection is greater than 45 degrees and less than 90 degrees;
e) a plurality of peripheral projections, each peripheral projection of the plurality of peripheral projections comprising a conical spike portion at one longitudinal end and a threaded portion at the other longitudinal end, the conical spike portion supporting a carbide tip and the threaded portion threaded into the respective threaded opening of the plurality of planar projection support surfaces, each of the peripheral projections are spaced around the periphery of the impact head such that each of the peripheral projections are coplanar and the carbide tips of the respective spaced peripheral projections are located on a common plane that is perpendicular to the longitudinal axis of the impact head;
f) a handle attachment structure for attaching the handle to the second axial end of the impact head.

13. The glass breaking tool of claim 12, wherein the cylindrical mass section has a diameter equal to the maximum diameter of the conically tapered section.

14. The glass breaking tool of claim 12, wherein the rake portion has a plurality of tine sections along the cylindrical periphery.

15. The glass breaking tool of claim 12, further comprising a seat belt cutter and removable end cap on the end of the handle furthest from the impact head.

16. An impact head attachment for transforming a baton into a swingable glass-breaking tool, the impact head extending along a longitudinal axis from a first axial end to a second axial end with a threaded opening at the second axial end to facilitate connection to a baton, the impact head comprising a cylindrical mass section that extends along the longitudinal axis, a conically tapered section that extends from a first end of the cylindrical mass section conically toward an apex at the first axial end of the impact head, and a rake portion with a cylindrical periphery extending from a second end of the cylindrical mass portion that is opposite the first end of the cylindrical mass portion; the impact head further comprising a carbide tip provided at the apex of the conical shape of the impact head, the carbide tip extending along the longitudinal axis of the impact head; and a plurality of peripheral projections arranged on a common plane around the periphery of the impact head, each peripheral projection comprising a carbide tip, planar hex surfaces, and a threaded extension for attachment to the impact head; and a threaded adapter threaded into the threaded opening, the threaded adapter comprising a first threaded portion threaded into the threaded opening and a second threaded portion extending axially from the impact head for attachment into a different threaded opening in the baton, the threaded adapter including two dissimilar threaded portions.

17. The impact head attachment of claim 16, wherein the peripheral projections are arranged such that all of the plurality of peripheral projections are disposed on a cross-section taken along the longitudinal axis of the impact head.

\* \* \* \* \*